United States Patent
Bao et al.

(10) Patent No.: US 11,769,123 B2
(45) Date of Patent: *Sep. 26, 2023

(54) PAYMENT METHOD AND APPARATUS, RELATED DEVICE, AND SYSTEM

(71) Applicant: TENCENT TECHNOLOGY (SHENZHEN) COMPANY LTD, Guangdong (CN)

(72) Inventors: Dong Po Bao, Shenzhen (CN); Song Jian Wang, Shenzhen (CN); Jian Wei Deng, Shenzhen (CN); Rui Zhou Wu, Shenzhen (CN); Dan Zeng, Shenzhen (CN); Qiang Fei, Shenzhen (CN); Ning Guo Chen, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,748

(22) Filed: Aug. 22, 2022

(65) Prior Publication Data

US 2022/0398554 A1    Dec. 15, 2022

Related U.S. Application Data

(63) Continuation of application No. 17/016,969, filed on Sep. 10, 2020, now Pat. No. 11,461,745, which is a
(Continued)

(30) Foreign Application Priority Data

May 15, 2018   (CN) .......................... 201810463712.5

(51) Int. Cl.
*G06Q 20/08*        (2012.01)
*G06Q 20/02*        (2012.01)
(Continued)

(52) U.S. Cl.
CPC ......... *G06Q 20/0855* (2013.01); *G06Q 20/02* (2013.01); *G06Q 30/0185* (2013.01); *G06Q 30/04* (2013.01); *G06Q 40/12* (2013.12)

(58) Field of Classification Search
CPC .............. G06Q 20/0855; G06Q 20/02; G06Q 30/0185; G06Q 30/04; G06Q 40/12
See application file for complete search history.

(56) References Cited

U.S. PATENT DOCUMENTS 6,816,840 B1 *  11/2004  Goodwin, III ....... G06Q 20/201
                                                          705/20
8,353,448 B1 *   1/2013  Miller ................ G06Q 20/3276
                                                          235/379
(Continued)

FOREIGN PATENT DOCUMENTS

CN         105469294 A      4/2016
CN         106557962 A      4/2017
(Continued)

OTHER PUBLICATIONS

Zhang et al. "A mutual authentication enabled fair-exchange and anonymous e-payment protocol." The 8th IEEE International Conference on E-Commerce Technology and The 3rd IEEE International Conference on Enterprise Computing, E-Commerce, and E-Services (CEC/EEE'06). IEEE, 2006. (Year: 2006).*

(Continued)

*Primary Examiner* — Asfand M Sheikh
(74) *Attorney, Agent, or Firm* — Sughrue Mion, PLLC

(57) ABSTRACT

A payment method by a processing server to process payment that is independently performed between a user equipment and a payment channel server is provided. The method includes: generating, by the processing server, a payment order bound to a merchant order generated by a merchant device by determining a corresponding item ID, of a service and/or a product for purchase, that is registered with the (Continued)

payment channel server, the merchant order corresponding to the service and/or the product provided by the merchant device; obtaining, by the processing server, a payment voucher corresponding to the payment order; matching, by the processing server, based on the payment voucher, the merchant order bound to the payment order; and transmitting, by the processing server to the merchant device, based on the matched merchant order, a service/product providing notification for providing the service and/or the product to the user equipment.

16 Claims, 11 Drawing Sheets

Related U.S. Application Data continuation of application No. PCT/CN2019/082281, filed on Apr. 11, 2019.

(51) Int. Cl.
*G06Q 30/04* (2012.01)
*G06Q 40/12* (2023.01)
*G06Q 30/018* (2023.01)

(56) References Cited

U.S. PATENT DOCUMENTS

| | | | |
|---|---|---|---|
| 8,720,771 B2 | 5/2014 | MacKinnon Keith | |
| 9,892,436 B1 | 2/2018 | Gannon et al. | |
| 10,134,084 B1 | 11/2018 | Gabriele et al. | |
| 11,126,959 B2 | 9/2021 | Grabovski et al. | |
| 11,132,655 B2* | 9/2021 | Swaminathan | G06Q 20/3825 |
| 2002/0188561 A1* | 12/2002 | Schultz | G07F 7/1008 |
| | | | 705/40 |
| 2007/0005490 A1* | 1/2007 | Gopalakrishnan | G06Q 30/06 |
| | | | 705/37 |
| 2009/0119188 A1 | 5/2009 | Pagan | |
| 2010/0223153 A1 | 9/2010 | Sin | |
| 2013/0256403 A1* | 10/2013 | MacKinnon Keith | |
| | | | G06Q 20/20 |
| | | | 235/375 |
| 2014/0025521 A1* | 1/2014 | Alsina | G06Q 30/0601 |
| | | | 705/26.1 |
| 2014/0046787 A1* | 2/2014 | Norman | G06Q 30/016 |
| | | | 705/26.5 |
| 2015/0100476 A1 | 4/2015 | Agapitov | |
| 2015/0278811 A1* | 10/2015 | Lalchandani | G06Q 20/202 |
| | | | 705/42 |
| 2015/0332244 A1* | 11/2015 | Zhang | G06Q 20/123 |
| | | | 705/39 |
| 2015/0339656 A1* | 11/2015 | Wilson | G06Q 20/12 |
| | | | 705/44 |
| 2016/0042341 A1* | 2/2016 | Griffin | G06Q 20/3674 |
| | | | 705/44 |
| 2016/0234302 A1 | 8/2016 | Wu et al. | |
| 2016/0307151 A1 | 10/2016 | Grabovski et al. | |
| 2017/0017952 A1 | 1/2017 | Choi et al. | |
| 2018/0060863 A1* | 3/2018 | Miryala | G06Q 20/3223 |
| 2020/0047865 A1* | 2/2020 | Alsina | B63H 20/12 |

FOREIGN PATENT DOCUMENTS

| | | |
|---|---|---|
| CN | 106779702 A | 5/2017 |
| CN | 107067239 A | 8/2017 |
| CN | 107194683 A | 9/2017 |
| CN | 107230058 A | 10/2017 |
| CN | 107730366 A | 2/2018 |
| CN | 107748985 A | 3/2018 |
| EP | 3 291 161 A1 | 3/2018 |
| JP | 2007-102590 A | 4/2007 |
| JP | 2009-26115 A | 2/2009 |
| WO | 2016020971 A1 | 2/2016 |
| WO | 2017050069 A1 | 3/2017 |

OTHER PUBLICATIONS

Extended European Search Report dated Feb. 10, 2021 in European Application No. 19803022.3.
Written Opinion of the International Searching Authority dated Jul. 12, 2019 in International Application No. PCT/CN2019/082281.
Communication dated Oct. 18, 2021 by the Japanese Patent Office in application No. 2020-545730.
International Search Report for PCT/CN2019/082281 dated Jul. 12, 2019 (PCT/ISA/210).
Newunhella, D. C. A smart mobile in-app purchasing solution for gaming community. Diss. 2021. (Year: 2021).
Lai, Yeh-chi, and Mohammad Husain. "A Holistic Approach for Securing In-app Purchase (IAP) Vulnerability in Mobile Applications.", ACSAC, Los Angeles, California, (Year: 2016).

* cited by examiner

PAYMENT METHOD AND APPARATUS, RELATED DEVICE, AND SYSTEM

CROSS-REFERENCE TO RELATED APPLICATION(S)

The application is a continuation application of U.S. application Ser. No. 17/016,969, filed Sep. 10, 2020, which is a bypass continuation application of International Application No. PCT/CN2019/082281, filed on Apr. 11, 2019, which claims priority to China Patent Application No. 201810463712.5, filed with the China National Intellectual Property Administration on May 15, 2018 and entitled "PAYMENT METHOD AND APPARATUS, RELATED DEVICE, AND SYSTEM", the disclosures of which are herein incorporated by reference in their entireties.

FIELD

The disclosure relates to the field of data processing technologies, and specifically, to a payment method and an apparatus, a related device, and a system.

BACKGROUND

When a user purchases a virtual value-added service, the purchase and payment of the virtual value-added service needs to be implemented by using a payment channel. More specifically, when a user purchases a virtual value-added service in an application, the purchase and payment of the virtual value-added service in the application may be implemented by using a payment channel provided by a mobile operating system, for example, an In APP Purchase (IAP) payment channel launched by iOS (iOS is a mobile operating system developed by Apple Inc.), or a Google Wallet (GW) payment channel launched by Android. These payment channels may be considered as in-app payment channels, and mainly support the purchase and payment of a virtual value-added service in an application.

With the rise of platform-level applications, a growing number of merchants providing virtual value-added services access an application. There is a great demand for providing a payment support (or payment function) for virtual value-added services provided by the merchants.

SUMMARY

One or more example embodiments of the disclosure provide a payment method and apparatus, a related device, and a system, to provide payment support for virtual value-added services provided by a plurality of merchants in an application.

According to an aspect of an example embodiment, provided is a payment method by a processing server to process payment that is independently performed between a user equipment and a payment channel server, the method including: generating, by the processing server, a payment order bound to a merchant order generated by a merchant device by determining a corresponding item ID, of a service and/or a product for purchase, that is registered with the payment channel server, the merchant order corresponding to the service and/or the product provided by the merchant device; obtaining, by the processing server, a payment voucher corresponding to the payment order; matching, by the processing server, based on the payment voucher, the merchant order bound to the payment order; and transmitting, by the processing server to the merchant device, based on the matched merchant order, a service/product providing notification for providing the service and/or the product to the user equipment.

According to an aspect of an example embodiment, provided is a payment method, including: generating, by a merchant device, a merchant order corresponding to a virtual value-added service that user equipment requests to purchase; transmitting, by the merchant device, a payment order generation request to a processing server, the payment order generation request being used for requesting the processing server to generate a payment order bound to the merchant order; receiving, by the merchant device, a service providing notification transmitted by the processing server, the service providing notification being transmitted by the processing server after the processing server obtains a payment voucher corresponding to the payment order and matches the merchant order bound to the payment order; and providing, by the merchant device, according to the service providing notification, the virtual value-added service corresponding to the matched merchant order for the user equipment.

According to an aspect of an example embodiment, provided is a payment method, including: obtaining, by user equipment, a payment pull-up notification indicating at least a payment order and transmitted by a processing server, the payment order being bound to a merchant order generated by a merchant device, the merchant order corresponding to a virtual value-added service that the user equipment requests to purchase; transmitting, by the user equipment, a payment voucher corresponding to the payment order to the processing server; and obtaining, by the user equipment, a virtual value-added service provided by the merchant device, the virtual value-added service being provided by the merchant device after the processing server matches the merchant order bound to the payment order according to the payment voucher and instructs the merchant device to provide the virtual value-added service corresponding to the matched merchant order.

According to an aspect of an example embodiment, provided is a payment apparatus, applied to a processing server to process payment that is independently performed between a user equipment and a payment channel server, the payment apparatus including: at least one memory configured to store program code; and at least one processor configured to read the program code and operate as instructed by the program code, the program code including: payment order generation code configured to cause at least one of the at least one processor to generate a payment order bound to a merchant order generated by a merchant device by determining a corresponding item ID, of a service and/or a product for purchase, that is registered with the payment channel server, the merchant order corresponding to the service and/or the product provided by the merchant device; payment voucher obtaining code configured to cause at least one of the at least one processor to obtain a payment voucher corresponding to the payment order; merchant order matching code configured to cause at least one of the at least one processor to match, based on the payment voucher, the merchant order bound to the payment order; and service providing notification code configured to cause at least one of the at least one processor to transmit, based on the matched merchant order, a service/product providing notification for providing the service to the user equipment.

According to an aspect of an example embodiment, provided is a processing server, including: at least one memory and at least one processing chip, the memory storing a program, and the processing chip invoking the program to implement the operations of the foregoing payment method performed by the processing server.

According to an aspect of an example embodiment, provided is a payment apparatus, applied to a merchant device, the payment apparatus including: at least one memory configured to store program code; and at least one processor configured to read the program code and operate as instructed by the program code, the program code including: merchant order generation code configured to cause at least one of the at least one processor to generate a merchant order corresponding to a service and/or a product provided by the merchant device; payment order generation request code configured to cause at least one of the at least one processor to transmit, to a processing server, a request for a payment order bound to the merchant order, the payment order being generated by the processing server based on determining a corresponding item ID, of the service and/or the product for purchase, that is registered with a payment channel server; service providing notification receiving code configured to cause at least one of the at least one processor to receive a service/product providing notification from the processing server, the service providing notification being based on a payment voucher that is obtained corresponding to the payment order bound to the merchant order; and service providing code configured to cause at least one of the at least one processor to provide, based on the service/product providing notification, the service and/or the product corresponding to the matched merchant order to user equipment.

According to an aspect of an example embodiment, provided is a merchant device, including: at least one memory and at least one processing chip, the memory storing a program, and the processing chip invoking the program to implement the operations of the foregoing payment method performed by the merchant device.

According to an aspect of an example embodiment, provided is a payment apparatus, applied to user equipment, the payment apparatus including: at least one memory configured to store program code; and at least one processor configured to read the program code and operate as instructed by the program code, the program code including: payment pull-up notification obtaining code configured to cause at least one of the at least one processor to obtain a payment pull-up notification indicating at least a payment order and transmitted by a processing server, the payment order being bound to a merchant order generated by a merchant device, the merchant order corresponding to a virtual value-added service that the user equipment requests to purchase; a payment voucher transmitting code configured to cause at least one of the at least one processor to transmit a payment voucher corresponding to the payment order to the processing server; and a service obtaining code configured to cause at least one of the at least one processor to obtain a virtual value-added service provided by the merchant device, the virtual value-added service being provided by the merchant device after the processing server matches the merchant order bound to the payment order according to the payment voucher and instructs the merchant device to provide the virtual value-added service corresponding to the matched merchant order.

According to an aspect of an example embodiment, provided is user equipment, including: at least one memory and at least one processing chip (or at least one processor), the memory storing a program, and the processing chip invoking the program to implement the operations of the foregoing payment method performed by the user equipment.

According to an aspect of an example embodiment, provided is a non-transitory storage medium, storing a program suitable for being executed by a processing chip, to implement the operations of the foregoing payment method performed by the processing server, or to implement the operations of the foregoing payment method performed by the merchant device, or to implement the operations of the foregoing payment method performed by the user equipment.

According to an aspect of an example embodiment, provided is a payment system, including: the foregoing processing server, the foregoing merchant device, and the foregoing user equipment.

BRIEF DESCRIPTION OF THE DRAWINGS

To describe the technical solutions in the embodiments of the disclosure or the related art more clearly, the following briefly describes the accompanying drawings required for describing the embodiments or the related art. Apparently, the accompanying drawings in the following descriptions show merely some embodiments of the disclosure, and a person of ordinary skill in the art may still derive other drawings from these accompanying drawings without creative efforts.

DETAILED DESCRIPTION

Figure 1:
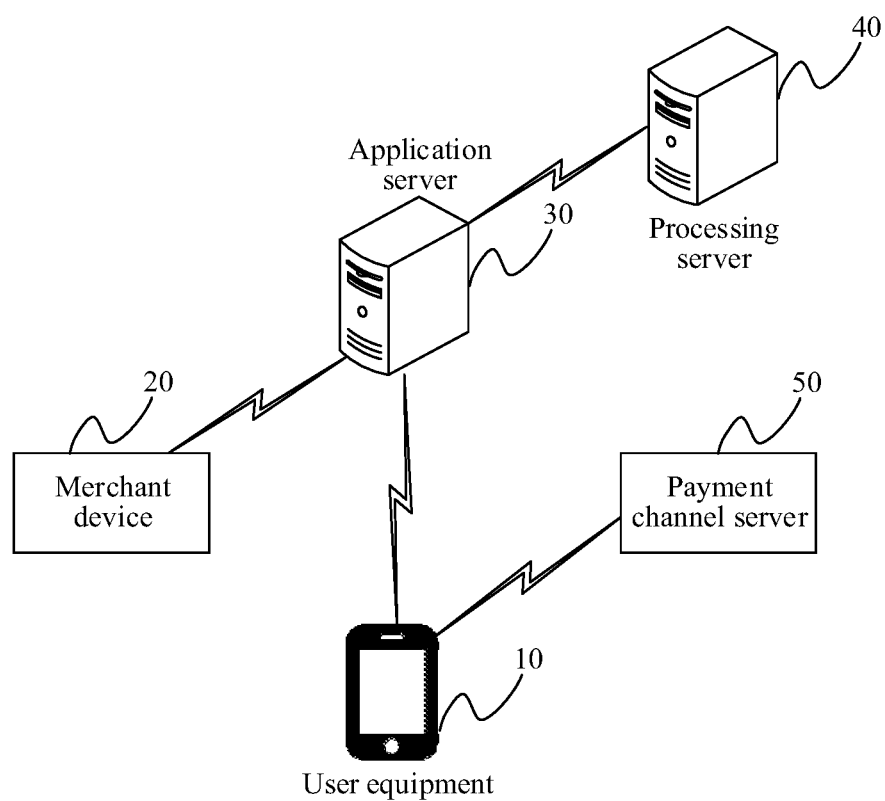
FIG. 1 is an optional structural block diagram of a payment system according to an embodiment of the disclosure.

When a user purchases a virtual value-added service in an application, a related art payment method is mainly implemented as follows: because payment channels have their own item management systems (for example, IAP, GW and other in-app payment channels have their own item management systems), payment orders suitable for payment channels (such as in-app payment orders for IAP, GW and other in-app payment channels) need to be constructed to perform payment according to requirements of these payment channels. Optionally, the application needs to virtualize the virtual value-added service provided by a merchant into an item identification (ID) and register the item ID to a payment channel server. Based on this, when the virtual value-added service is purchased by using the related art payment method, the payment channel may be pulled up, the user communicates with the payment channel server and purchases the virtual value-added service by paying the payment order corresponding to the item ID. After completing the payment of the payment order, the user may obtain a payment voucher, thereby instructing the merchant to provide the virtual value-added service.

The payment channel server is a server of a payment channel, for example, a server of an IAP payment channel, a server of a GW payment channel, and the like. The payment channel server is mainly implemented by a server corresponding to a payment channel.

In the related art payment method, the application virtualizes, mainly based on an account of the application in the payment channel server, the value-added service provided by the merchant into the item ID (for example, when a social application requires a paid subscription service of an online merchant and performs payment by using IAP payment, the staff of the social application needs to virtualize, based on an account registered by the social application in an IAP payment channel server, the paid subscription service of the merchant into an item ID and register the item ID to the IAP payment channel server), and constructs the payment order to meet the user's payment requirements. This can satisfy basic payment requirements when there is only one merchant in the application. However, when there are a plurality of merchants providing virtual value-added services in the application, the related art payment method has at least the following problems:

In the related art payment method, the item ID is registered mainly based on the account of the application in the payment channel server, and the binding of a virtual value-added service order to a payment order is not supported. The user's payment behavior is separated from the actual virtual value-added service order. Therefore, when there are a plurality of merchants in the application, after obtaining the payment voucher, the user cannot query the virtual value-added service order by using the payment voucher.

It can be learned that, in a case that a plurality of merchants providing virtual value-added services access one application, the related art payment solution cannot effectively provide payment support for the virtual value-added services of the plurality of merchants.

FIG. 1 is an optional structural block diagram of a payment system according to an embodiment of the disclosure. As shown in FIG. 1, the payment system may include: user equipment 10, a merchant device 20, an application server 30, a processing server 40, and a payment channel server 50. While it is described in the specification that a transaction is made to purchase a virtual value-added service (or a virtual commodity) provided by a merchant device; however, the disclosure is not limited thereto and may apply to any transaction for purchasing various types of an item such as a product or real-world service as well as a virtual commodity. Hereinafter, for purpose of illustration, example embodiments involved with purchasing a virtual value-added service is described as an example.

The user equipment may be an electronic device used by a user who purchases a virtual value-added service, for example, a smartphone, a tablet computer, or another user terminal.

The merchant device may be an electronic device corresponding to a merchant providing a virtual value-added service, and may be implemented by using a merchant terminal or a merchant server.

The application server is a service device corresponding to a platform-level application, mainly provides users with application services (for example, a social application server provides users with social services, and an e-commerce server provides users with e-commerce services), and supports the expansion and extension of different service functions (for example, in addition to providing social application services, a social application server may further provide self-media services (or services to provide self-produced contents) and applet services through expansion and extension). In the embodiments of the disclosure, a merchant may access the application server to provide virtual value-added services in an application.

The user equipment and the merchant device may use application installation packages of applications to load the applications. Therefore, the user equipment and the merchant device may interact with the application server through the loaded applications.

The processing server is a set of service devices that are connected to the application server and that are used for implementing the payment method in the embodiments of the disclosure. In an optional implementation, the processing server may be a service device connected to the application server, and the communication between the processing server and the user equipment and the merchant device may be implemented by using the application server as a bridge, that is, the communication between the processing server and the user equipment may be implemented by using the application server as a relay, and the communication between the processing server and the merchant device may be implemented by using the application server as a relay.

The payment channel server is a service device corresponding to a payment channel. For example, under an Android operating system, the payment channel server may be a GW payment channel server corresponding to a GW payment channel launched by Android, and under an iOS operating system, the payment channel server may be an IAP payment channel server corresponding to an IAP payment channel launched by iOS.

FIG. 1 is only an optional system architecture. In another optional implementation, the processing server may be implemented as a newly added service function of the application server. That is, the flow of operations performed by the processing server below may also be regarded as the implementation of the service function added in the application server.

Based on the foregoing in-app payment system, before the payment method provided in the embodiments of the disclosure is introduced, for a better understanding of the use background of the embodiments of the disclosure, the following lists some examples in which merchants provide virtual value-added services in an application. In the following examples, a user loads a service page of the merchant mainly through the application, and purchases the virtual value-added service from the virtual value-added service provided on the service page.

Using a social application as an example, self-media accounts (such as public accounts) in the social application that post self-produced contents may become merchants and provide the user with virtual value-added services such as paid subscriptions. The user may purchase, by using the payment solution provided in the embodiments of the disclosure, subscription services provided by different merchants.

In another example, the social application may provide the loading function of different programs through extension. Optionally, after creating a program, a program creator may provide virtual value-added services such as content payment and recharge in the program, and may publish a link QR code or link address of the program. After the user scans the link QR code or accesses the link address through the social application, the social application will load a program page through a corresponding page. In this case, the user may purchase the virtual value-added services such as content payment and recharge provided on the program page by using the payment solution provided in the embodiments of the disclosure.

Optionally, an example of the loading function of different programs provided by the social application through extension may be, for example, a WeChat applet function or a WeChat mini-program. An applet is a program that can be used without downloading and installing, and the user may scan a QR code of the applet or search for the applet through WeChat to load a corresponding applet page in WeChat. A mini-program is a program that can be used to provide frequently used services in the form of icons and driving them separately, so contents can be received without opening a web browser. The WeChat mini-program is a mini-application built within the WeChat platform that provides features without downloading and installing.

Using a knowledge-paying application as another example, a registered user may sell professional knowledge in the knowledge-paying application and become a merchant. Another user may purchase professional knowledge from different merchants by using the payment solution provided in the embodiments of the disclosure.

As can be learned from the examples listed above, when there are a plurality of merchants providing virtual value-added services (for example, a plurality of self-media accounts providing virtual value-added services, merchants of different applets, different merchants selling professional knowledge, and the like) in the same application, providing payment support for virtual value-added services of the plurality of merchants in one application is to be implemented in the embodiments of the disclosure.

The role of a user and the role of a merchant are not strictly separated. In some cases, the same person may have both the role of a user and the role of a merchant, for example, an owner of a self-media account may be a merchant who sells virtual value-added services such as paid subscriptions to other users, and may also be a user who buys virtual value-added services provided by other self-media accounts.

Figure 2:
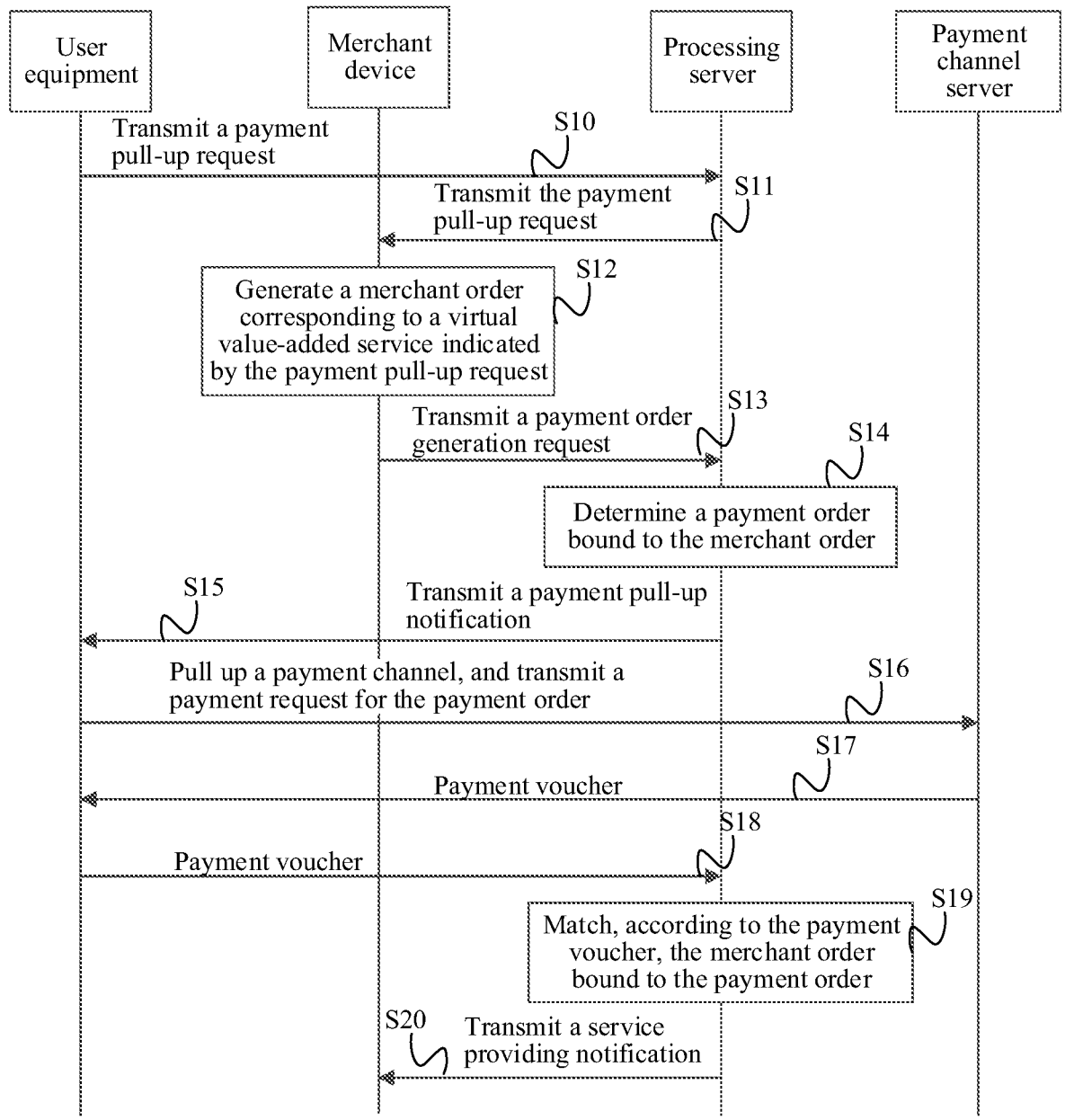
FIG. 2 is a signaling flowchart of a payment method according to an embodiment of the disclosure.

Based on the foregoing introduction, the payment method provided in the embodiments of the disclosure is described below. In an optional implementation, FIG. 2 shows a signaling procedure of a payment method according to an embodiment of the disclosure. Referring to FIG. 2, the procedure may include the following operations S10-S20.

Operation S10. User equipment transmits a request to perform payment for purchasing at least a virtual value-added service (hereinafter, referred to as 'payment pull-up request') to a processing server, the payment pull-up request indicating at least a virtual value-added service that the user equipment requests to purchase.

Optionally, the user equipment may transmit the payment pull-up request to the processing server through an application server.

Optionally, in an example, after the user equipment accesses a service page of a merchant through an application (for example, the user equipment accesses an applet page of a merchant through a social application), the service page may have a payment pull-up entry of at least one virtual value-added service provided by the merchant. One payment pull-up entry may correspond to one virtual value-added service.

Optionally, in the applet scenario, an optional implementation of accessing, by the user equipment, a service page of a merchant through an application may be that: the user equipment scans a link QR code on a program page of the merchant through the application, or accesses a link address on a program page of the merchant through the application to load the program page of the merchant; and the loaded program page has at least one payment pull-up entry of a virtual value-added service provided by the merchant.

When a user clicks a payment pull-up entry of a virtual value-added service, it may be considered that the user selects the virtual value-added service that needs to be purchased, and requests to pull up the payment of the virtual value-added service. Therefore, based on the payment pull-up entry clicked by the user, the user equipment may configure a payment pull-up request accordingly, and the payment pull-up request indicates at least the virtual value-added service.

In an example, the user clicks the payment pull-up entry of the virtual value-added service on the service page of the merchant, to request to pull up the payment for the virtual value-added service.

Operation S11. The processing server transmits the payment pull-up request to a merchant device.

The processing server may forward the payment pull-up request to the merchant device corresponding to the service page accessed by the user.

Optionally, the processing server may transmit the payment pull-up request to the merchant device through the application server.

In an optional implementation, the payment pull-up request may include a merchant identifier, and the processing server may transmit the payment pull-up request to a merchant device corresponding to the merchant identifier. The service page of the merchant may be associated with the corresponding merchant identifier. When accessing a service page of a merchant through an application, the user equipment may transmit, according to a merchant identifier associated with the service page accessed by the user equipment, a payment pull-up request to a merchant device corresponding to the merchant identifier.

Optionally, the processing server may also set commodity identifiers corresponding to merchants. The processing server may determine, according to a commodity identifier (one commodity identifier may uniquely identify one virtual value-added service) included in the payment pull-up request, a merchant corresponding to the commodity identifier, and transmit the payment pull-up request to a merchant device corresponding to the determined merchant.

Operation S12. The merchant device generates, according to the payment pull-up request, a merchant order corresponding to the virtual value-added service.

It can be learned that, in this embodiment of the disclosure, after the user equipment requests to pull up the payment for the virtual value-added service, a corresponding payment order is not directly configured by the processing server. In this embodiment of the disclosure, the newly added processing server needs to notify the merchant device that the user equipment pulls up the payment for the virtual value-added service, so that the merchant device generates a merchant order that corresponds to the virtual value-added service and that can be managed by the merchant device.

Optionally, in an optional implementation, the payment pull-up request may include at least a commodity identifier corresponding to the virtual value-added service, and the merchant device may configure a merchant order corresponding to the commodity identifier.

The virtual value-added service may be regarded as a virtual commodity, so that the commodity identifier may be used for identifying the virtual value-added service. One commodity identifier may uniquely identify one virtual value-added service.

Operation S13. The merchant device transmits a payment order generation request to the processing server.

The payment order generation request referred to herein refers to requesting the processing server to generate a corresponding payment order, so that the user equipment may subsequently use the payment order to pay the virtual value-added service.

Optionally, the merchant device may transmit the payment order generation request to the processing server through the application server.

Operation S14. The processing server determines the payment order bound to the merchant order.

It would be understood that, payment channels such as IAP and GW all have their own item management systems, and the payment channels are used for paying the virtual value-added service by paying an item ID registered to a payment channel server. Therefore, after configuring the merchant order that may be managed by the merchant device, the merchant device also needs to transmit the payment order generation request to the processing server to request the processing server to generate a payment order suitable for payment channels such as IAP and GW.

In an optional implementation, the processing server may determine the payment order by determining the corresponding item ID.

Figure 3:
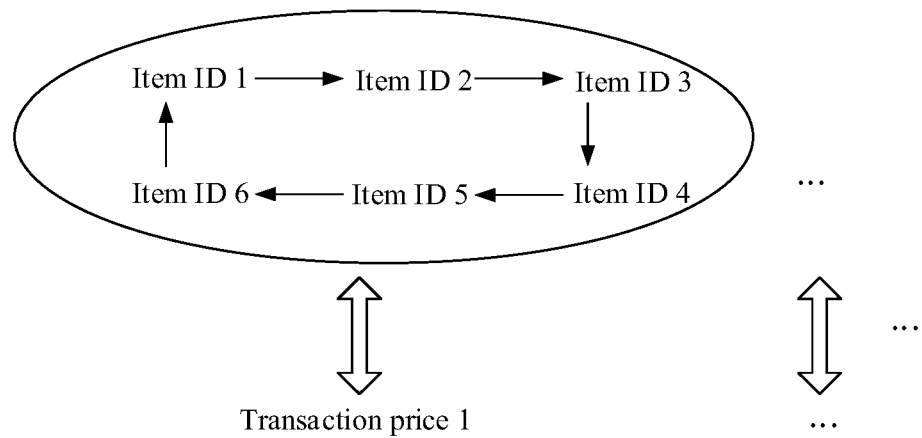
FIG. 3 is a schematic diagram of a relationship between an item ID and a transaction price.

Optionally, the item ID may correspond to a transaction price. FIG. 3 is a schematic diagram of an optional relationship between an item ID and a transaction price. As shown in FIG. 3, one transaction price may have a plurality of corresponding item IDs, and the plurality of item IDs are sequentially used in order. That is, the plurality of item IDs with one transaction price correspond to the transaction price in a polling manner, which is a method of periodically and sequentially supplying the plurality of item IDs to be assigned to the transaction price. As shown in FIG. 3, assuming that a transaction price 1 has 6 corresponding item IDs, in a process in which the user equipment requests to pull up the payment of virtual value-added services with the transaction price 1 for a plurality of consecutive times, when the transaction price 1 is used for requesting to pull up the payment at the first time, item ID1 may be used for corresponding to the transaction price 1, when the transaction price 1 is used for requesting to pull up the payment at the second time, item ID2 is used for corresponding to the transaction price 1, and by analogy, when the transaction price 1 is used for requesting to pull up the payment at the seventh time, item ID1 is used for corresponding to the transaction price 1 after a cycle (that is, the item ID at the first time are repeated as the item ID at the seventh time).

The relationship between the transaction price and the item ID shown in FIG. 3 is only provided as an optional example. In an implementation, the relationship between the transaction price and the item ID may also be adjusted according to a different payment channel. For example, the transaction price corresponds to a unique item ID in one purchase.

Optionally, in this embodiment of the disclosure, the processing server may determine an item ID corresponding to the transaction price based on at least the transaction price of the merchant order, and bind the item ID to the merchant order, to determine a payment order bound to the merchant order.

Operation S10 to Operation S14 are only an optional implementation of determining, by a processing server, a payment order bound to a merchant order generated by a merchant device, the merchant order corresponding to a virtual value-added service that user equipment requests to purchase.

In Operation S10 to Operation S14, the processing server transmits a payment pull-up request of the user equipment to the merchant device, the payment pull-up request indicating at least a virtual value-added service that the user equipment requests to purchase, so that after the merchant device generates a merchant order corresponding to the virtual value-added service, the processing server obtains a payment order generation request indicating at least the merchant order and transmitted by the merchant device, to determine, according to the payment order generation request, a payment order bound to the merchant order. However, this is only an optional implementation of determining, by a processing server, a payment order bound to a merchant order generated by a merchant device. In this embodiment of the disclosure, another method in which the processing server generates, after the merchant device generates a merchant order corresponding to a virtual value-added service that the user equipment requests to purchase, a payment order bound to the merchant order may also be supported.

Operation S15. The processing server transmits, according to the payment order, a payment pull-up notification to the user equipment.

Optionally, the processing server may transmit the payment pull-up notification to the user equipment through the application server.

Optionally, the payment pull-up notification may be used for instructing the user equipment to pull up the payment channel, so that the user equipment may pay the payment order.

That is, after the merchant device generates, in response to a request, by the user equipment, to purchase the virtual value-added service, the merchant order that may be managed by the merchant device, and the processing server generates the payment order suitable for the payment channel and bound to the merchant order, the processing server may transmit the payment pull-up notification to the user equipment to instruct the user equipment to pull up the payment channel, so that the user equipment pays the payment order by using the payment channel.

In an optional implementation, the processing server may generate a corresponding payment entry according to the payment order, and the processing server may transmit the payment entry to the user equipment, to transmit the payment pull-up notification to the user equipment. Therefore, after obtaining the payment entry, the user equipment may display a payment page, so that the user pays the payment order after performing a payment verification input operation on the payment page.

In an optional implementation, in Operation S15, the processing server may alternatively first notify the merchant device of the payment order, so that the merchant device determines the payment order bound to the generated merchant order, and then the merchant device instructs the processing server to transmit the payment pull-up notification to the user equipment. That is, in Operation S15, after notifying the merchant device of the payment order and obtaining a feedback response of the merchant device, the processing server transmits the payment pull-up notification to the user equipment (that is, the processing server transmits the payment pull-up notification to the user equipment based on a notification from the merchant device).

In doing so, the merchant device pulls up the payment of the user equipment after determining and recording the payment order bound to the generated merchant order.

The foregoing implementation is only an exemplary embodiment. An implementation in which the processing server transmits the payment pull-up notification to the user equipment while notifying the merchant device of the payment order bound to the merchant order may also be supported in this embodiment of the disclosure.

Operation S16. The user equipment pulls up a payment channel, and transmits a payment request for the payment order to a payment channel server.

After receiving the payment pull-up notification transmitted by the processing server, the user equipment may pull up a payment channel, and perform a payment verification input operation (the payment verification input operation includes, but is not limited to, payment password input, payment fingerprint input, payment face input, and the like) of the payment order, to transmit a payment request for the payment order to a payment channel server.

In an optional implementation, the user equipment may receive a payment entry of the payment order and display a corresponding payment page, so that the user may perform the payment verification input operation on the payment page. After responding to the payment verification input operation performed by the user on the payment page, the user equipment may transmit the payment request for the payment order to the payment channel server.

Figure 4:
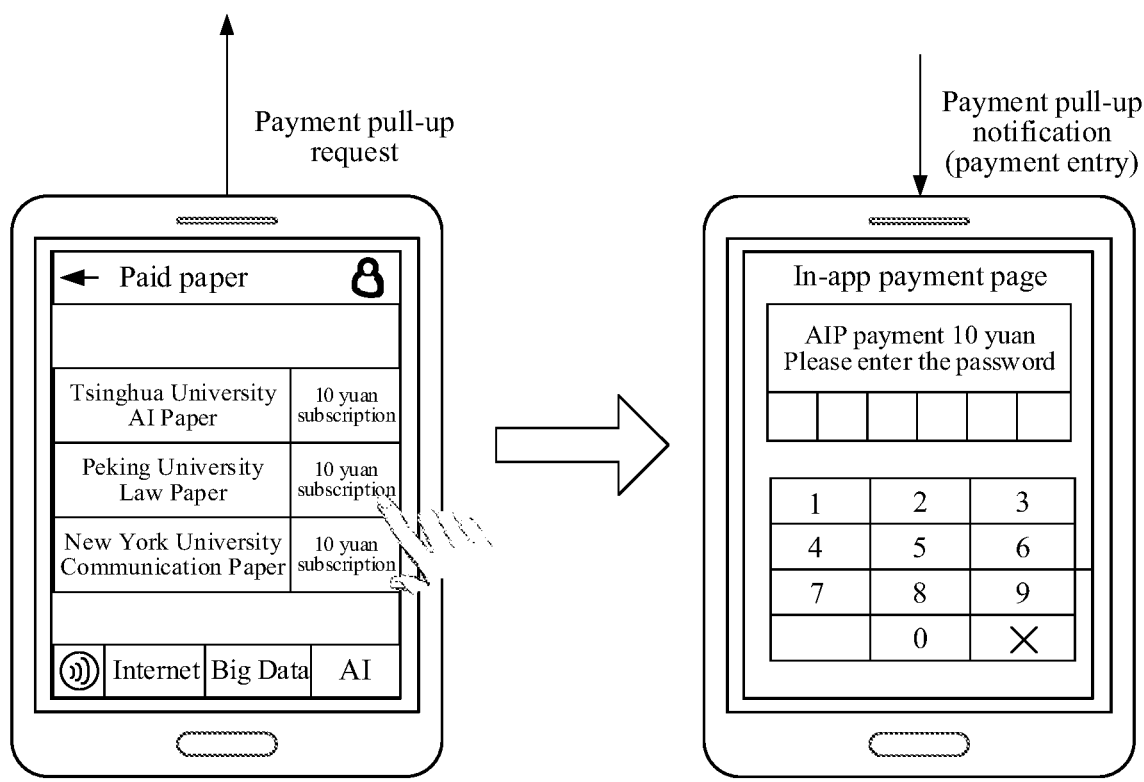
FIG. 4 is a schematic flowchart of payment based on user equipment performance.

In an example, in the payment process in this embodiment of the disclosure, the performance on the user equipment side may be shown in FIG. 4. For example, a self-media account (such as a self-media account named "Paid Paper" in the figure) in an application provides an access to published papers for a paid subscription. After the user clicks a paid subscription button for a paper in a service page of the self-media account, the user equipment may configure a payment pull-up request indicating a paid subscription. Therefore, after generating a corresponding merchant order for which the user requests the paid subscription, a merchant terminal may request the processing server to generate a corresponding payment order. After generating the corresponding payment order and binding the payment order to the merchant order, the processing server may transmit a payment entry corresponding to the payment order to the user equipment, so that the user equipment may display a corresponding payment page through the payment entry, perform a payment verification input operation, and transmit a payment request for the payment order to a payment channel server.

The payment pull-up request mentioned above and the payment request herein are two requests at different stages. The payment pull-up request is mainly generated when the user clicks the payment pull-up entry, and mainly requests to pull up the payment. The payment request is a payment request formed after the payment channel is pulled up and the user completes the payment verification input operation, and is a request for requesting the payment channel server to perform fee deduction and payment.

Operation S17. The user equipment receives a payment voucher of the payment order transmitted by the payment channel server.

Operation S18. The user equipment transmits the payment voucher to the processing server.

Optionally, operation S15 to operation S18 is only an exemplary implementation of obtaining, by the processing server, the payment voucher of the payment order. In operation S15 to operation S18, the processing server mainly transmits the payment pull-up notification to the user equipment according to the payment order, so that after the user equipment completes the payment, the payment voucher corresponding to the user equipment paying the payment order is obtained. However, this is only an optional implementation of obtaining, by the processing server, the payment voucher of the payment order. This embodiment of the disclosure may also support other implementations of obtaining, by the processing server, the payment voucher of the payment order.

Optionally, the payment channel server may complete the process of paying, by the user, the payment order based on the payment request of the user, and generate the corresponding payment voucher. The payment voucher indicates the payment order (such as the item ID) paid by the user. The payment channel server may transmit the payment voucher to the user equipment, and then the user equipment transmits the payment voucher to the processing server (optionally, the user equipment may transmit the payment voucher to the processing server through the application server).

Optionally, the payment voucher may further indicate a payment result of the payment.

Optionally, the item ID representing the payment order is registered to the payment channel server by the application, so that after generating the payment voucher corresponding to the item ID, the payment channel server may transmit the payment voucher to the application server, and the application server transmits the payment voucher to the connected processing server.

Operation S19. The processing server matches, according to the payment voucher, the merchant order as being bound to the payment order.

Optionally, the payment voucher may indicate the item ID used by the user equipment to complete the payment, to match the merchant order bound to the item ID, to implement operation S19.

In an optional implementation, in a case that one transaction price corresponds to a plurality of item IDs used sequentially in order as described above, a quantity of the merchant orders bound to the item ID may be one or more.

When there is one merchant order bound to the item ID, a uniquely bound merchant order may be matched by using the item ID.

When there are a plurality of merchant orders bound to the item ID, the user equipment is required to participate in decision-making (for example, the user equipment requests to purchase virtual value-added services with the same transaction price at the same transaction price for a plurality of times, however, in this case, the user equipment does not complete the final payment). The processing server may transmit the plurality of merchant orders bound to the item ID to the user equipment, and the user equipment determines the matched merchant order bound to the payment order.

The foregoing is only an optional implementation. In a case that when a transaction price is used for one time, the transaction price corresponds to a unique item ID, the processing server may match a uniquely bound merchant order based on the item ID.

Operation S20. The processing server transmits, according to the matched merchant order, a service providing notification for providing the corresponding virtual value-added service for the user equipment to the merchant device.

Optionally, the processing server may transmit the service providing notification to the merchant device through the application server.

It can be learned that, after the user equipment pays the payment order, and the processing server matches, according to the payment voucher corresponding to the payment, the merchant order bound to the payment order, the merchant device may receive the service providing notification transmitted by the processing server.

Optionally, after matching the merchant order bound to the payment order, the processing server may transmit the service providing notification to the merchant device. After receiving the notification, the merchant device may determine the virtual value-added service indicated by the merchant order, and provide the corresponding virtual value-added service to the user equipment.

Further, the processing server may further notify the user equipment that an order status of the matched merchant order is a status of service-to-be-provided.

Further, after the merchant device receives the notification, the user equipment may refresh the service page, so that the user equipment has the permission to use the virtual value-added service. The processing server may notify the user equipment that the order status of the matched merchant order is a status of service-provided.

Optionally, this embodiment of the disclosure may be applicable to in-app payment scenarios. The foregoing payment pull-up request may be an in-app payment pull-up request, the payment order generation request may be an in-app payment order generation request, the payment order may be an in-app payment order, the payment channel may be an in-app payment channel, the payment request may be an in-app payment request, and the payment voucher may be an in-app payment voucher.

Based on the foregoing payment method, when user equipment purchases a virtual value-added service in an application, a merchant device may generate a merchant order corresponding to the virtual value-added service, and a processing server determines a payment order that is applicable to a payment channel and is bound to the merchant order. Therefore, after the user equipment pays the payment order and purchases the virtual value-added service, the processing server may find the bound merchant order based on the payment order paid by the user equipment, so that the merchant device is accurately notified of the merchant order providing a service. Therefore, after the user equipment completes the payment, the virtual value-added service purchased by the user equipment is accurately provided.

In the embodiments of the disclosure, a payment action of a user and the virtual value-added service actually purchased may be associated with each other through the binding between the payment order and the merchant order. Therefore, when there are a plurality of merchants in an application, the user may query the bound merchant order by using the payment order, to query a purchased virtual value-added service order (that is, the merchant order), and provide payment support for virtual value-added services provided by the plurality of merchants in one application.

Although the foregoing payment method is described in the scenario where the user pays the virtual value-added service provided by one merchant, the method may be applied in a multi-merchant scenario. Adaptably, in the multi-merchant scenario where merchant orders are from a plurality of merchants, merchant orders corresponding to different virtual value-added services purchased by the user, it is still possible to distinguish, through the binding between the payment order and the merchant order. Accordingly, in the scenario where a plurality of merchants provide virtual value-added services, the query of the merchant orders of the merchants may be implemented. Although the foregoing description is described by using one merchant, it may be extended to the multi-merchant scenario, and after the user completes the payment, the merchant orders of different merchants may be accurately matched.

Further, in this embodiment of the disclosure, the merchant order number may be used for uniquely identifying the merchant order, and in a case that the item ID corresponds to the transaction price, the merchant device may input at least the transaction price of the merchant order and the merchant order number to the processing server, to implement the output of the item ID by the processing server to determine the payment order.

Figure 5:
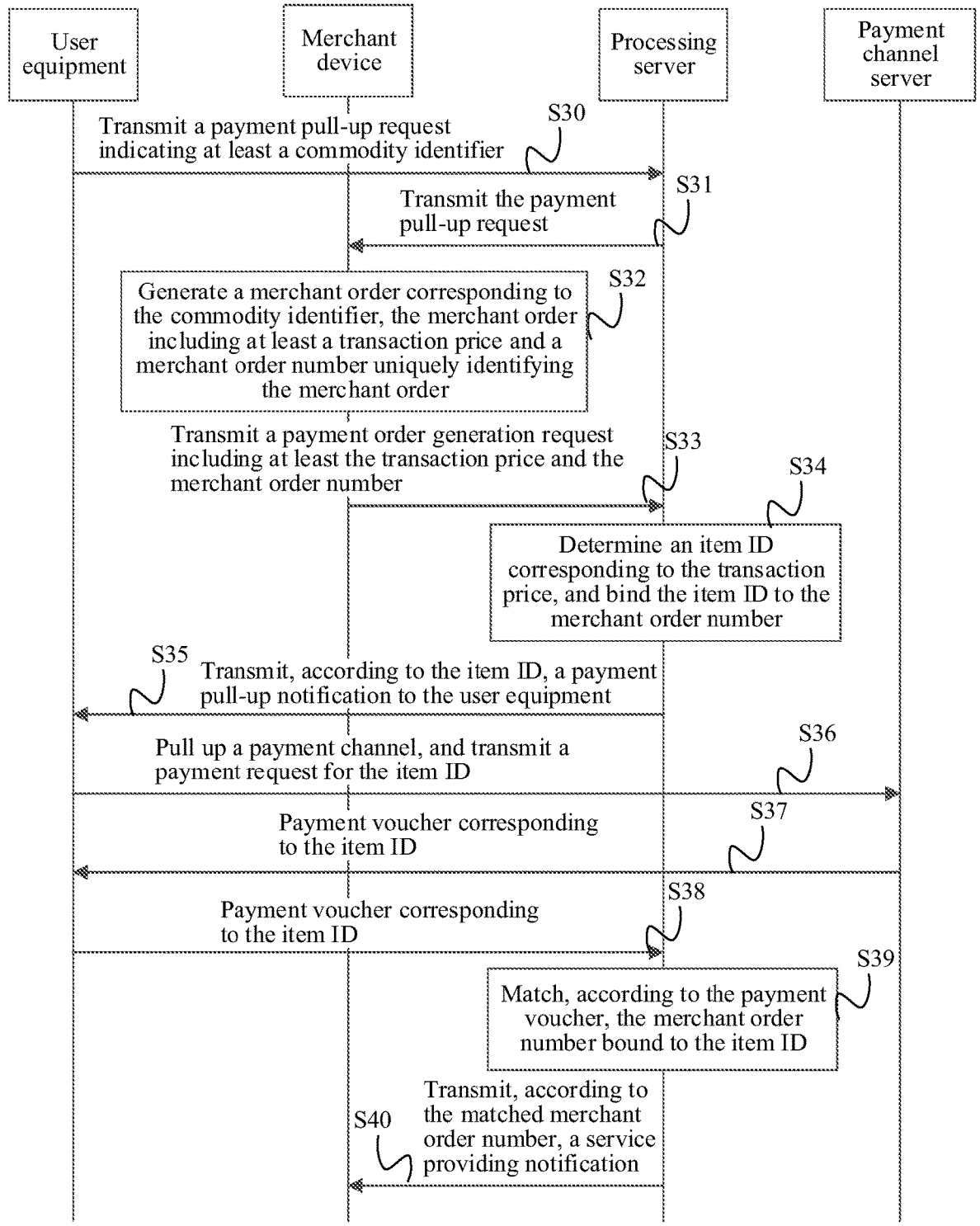
FIG. 5 is another signaling flowchart of a payment method according to an embodiment of the disclosure.

Optionally, FIG. 5 is an alternative signaling procedure of a payment method according to an embodiment of the disclosure. The procedure shown in FIG. 5 shows some implementation details of the operations shown in FIG. 2, but the procedure shown in FIG. 5 is only an exemplary procedure. It would be understood that modifications and variations can be made to implement the operations shown in FIG. 2.

Referring to FIG. 5, the procedure may include the following operations S30-S40.

Operation S30. User equipment transmits a payment pull-up request to a processing server, the payment pull-up request indicating at least a commodity identifier corresponding to a virtual value-added service that the user equipment requests to purchase.

In this embodiment of the disclosure, the commodity identifier may be used for uniquely identifying the virtual value-added service, and the corresponding commodity identifier may be included in the payment pull-up request to indicate the virtual value-added service that the user requests to purchase.

In an optional implementation, a payment pull-up entry on a service page of the merchant may be associated with a commodity identifier of a virtual value-added service. After the user clicks the payment pull-up entry of the virtual value-added service, the user equipment may determine the commodity identifier associated with the payment pull-up entry clicked by the user, so that a payment pull-up request including at least the commodity identifier is generated to indicate the virtual value-added service by using the commodity identifier.

Optionally, the commodity identifier of the virtual value-added service may be a commodity code or a delivery number set by the merchant for the virtual value-added service provided; one commodity identifier may uniquely represent a corresponding virtual value-added service; and the commodity identifier is different from the item ID registered to the payment channel server.

Operation S31. The processing server transmits the payment pull-up request to a merchant device.

Operation S32. The merchant device generates, according to the payment pull-up request, a merchant order corresponding to the commodity identifier, the merchant order including at least a transaction price and a merchant order number uniquely identifying the merchant order.

Optionally, the merchant device may configure, based on the commodity identifier included in the payment pull-up request, a merchant order corresponding to the commodity identifier, to generate a merchant order corresponding to the virtual value-added service.

The merchant order may further indicate a transaction price, and the transaction price may be determined based on pricing determined by the merchant for the virtual value-added service. Further, when the user requests to purchase a plurality of virtual value-added services at one time, the payment pull-up request may further include a quantity of transactions of the virtual value-added services, and the merchant device may determine the transaction price based on the quantity of transactions and a unit price of the virtual value-added service.

In addition, the merchant order generated by the merchant device may be represented by a unique merchant order number, to be distinguished from merchant orders of other merchants and to be distinguished from another merchant order of the same merchant.

In this embodiment of the disclosure, the generated merchant order may indicate at least basic information of the virtual value-added service that the user equipment requests to purchase this time, and the merchant order number uniquely identifying the merchant order.

In an optional implementation, the configured merchant order may include at least a transaction price, a merchant order number uniquely identifying the merchant order, and the like. Further, the merchant order may further include at least one of the following: a commodity identifier, a quantity of transactions of virtual value-added services, general configuration information, a user identity corresponding to the user equipment (such as a user account of the user in the application), and a merchant identity corresponding to the merchant device (such as a merchant account of the merchant in the application).

Operation S33. The merchant device transmits a payment order generation request to the processing server, the payment order generation request including at least the transaction price and the merchant order number.

Because the item ID representing the payment order corresponds to the transaction price, when transmitting the payment order generation request to the processing server, the merchant device may add the transaction price to the payment order generation request. In this embodiment of the disclosure, the binding between the payment order and the merchant order may be implemented by binding the merchant order number uniquely identifying the merchant order to the item ID.

Operation S34. The processing server determines an item ID corresponding to the transaction price, and binds the item ID to the merchant order number.

In this embodiment of the disclosure, the processing server may determine an item ID corresponding to the transaction price based at least on the transaction price and the merchant order number inputted by the payment order generation request, and bind the item ID to the merchant order number, to implement the binding between the item ID and the merchant order.

In an optional implementation, the processing server may set an item ID pool, and may record, in the item ID pool, item IDs corresponding to different transaction prices and registered to the payment channel server, one transaction price corresponding to a plurality of item IDs sequentially used in order, so that when determining the item ID corresponding to the transaction price of the merchant order, the processing server may determine, according to an order in which the user equipment uses the transaction price this time, an item ID corresponding to the order from the plurality of item IDs corresponding to the transaction price that are recorded in the item ID pool.

Further, after the item ID is determined, the item ID may be bound to the merchant order number.

Operation S35. The processing server transmits, according to the item ID, a payment pull-up notification to the user equipment.

After determining the item ID, the processing server may transmit a payment pull-up notification to the user equipment to instruct the user equipment to pull up a payment channel, so that the user equipment pays the item ID by using the payment channel. In this embodiment of the disclosure, the item ID may be used for representing a corresponding payment order.

Operation S36. The user equipment pulls up a payment channel, and transmits a payment request for the item ID to a payment channel server.

Operation S37. The user equipment receives a payment voucher corresponding to the item ID transmitted by the payment channel server.

The payment channel server may complete the process of paying, by the user, the item ID based on the payment request of the user, and generate the corresponding payment voucher. The payment voucher indicates the item ID paid by the user. The payment channel server may transmit the payment voucher to the user equipment, and the user equipment transmits the payment voucher to the processing server.

Operation S38. The user equipment transmits the payment voucher corresponding to the item ID to the processing server.

Operation S39. The processing server matches, according to the payment voucher, the merchant order number bound to the item ID.

Optionally, when there is one merchant order number bound to the item ID (that is, an item ID is uniquely bound to a merchant order), the merchant order number uniquely bound to the item ID may be matched.

When there are a plurality of merchant order numbers bound to the item ID (that is, the item ID is bound to a plurality of merchant orders), the merchant order number bound to the item ID may be matched based on the participation of the user equipment. The processing server may transmit, according to the plurality of merchant order numbers bound to the item ID, merchant orders corresponding to the plurality of merchant order numbers to the user equipment, and the user equipment determines the matched merchant order from the plurality of merchant orders. After determining the matched merchant order, the user equipment may notify the processing server of the determined merchant order number of the merchant order, so that the processing server matches the merchant order number bound to the item ID.

In an example, a case that the item ID is bound to a plurality of merchant orders is as follows: there are a plurality of 6 RMB/yuan paid subscription articles in a self-media account of a social application. Each time after a user clicks to pay, a merchant device may generate a paid subscription merchant order accordingly, and a social application server may generate a payment order by using an item ID corresponding to 6 RMB/yuan. It is assumed that there are ten item IDs that correspond to the transaction price (6 RMB/yuan) and that may be polled (that is, each of the ten item IDs is sequentially assigned to the transaction price).

In this process, if each time the user clicks to pay but does not perform an actual payment verification input operation, an item ID corresponding to 6 RMB/yuan used at the first payment click will be the same as an item ID corresponding to 6 RMB/yuan used at the eleventh payment click. That is, there is a case that the same item ID is bound to a paid subscription merchant order at the first payment click and a paid subscription merchant order at the eleventh payment click. As a result, after the user performs a payment verification input operation at the eleventh payment click (that is, actually pays at the eleventh payment click), the processing server cannot determine whether the item ID fed back by the payment channel server at this time is the paid subscription merchant order bound to the first payment click of the user, or the paid subscription merchant order bound to the eleventh payment click of the user. In this case, the user is required to participate in decision-making for two merchant orders that cannot be determined (that is, determine an intended merchant order between the two merchant orders).

The cause of this problem is that in-app payment channels such as IAP and GW cannot tell a developer whether the user actually pays at the first payment click or the eleventh payment click, and even a payment cancellation notification generated by the payment channel server when the user cancels the payment of the first payment click may be incredible. Because of this, when there are a plurality of merchant orders bound to the item ID, a mechanism that the user participates in decision-making is introduced, which is unique in this embodiment of the disclosure.

Operation S40. The processing server transmits, according to the matched merchant order number, a service providing notification for providing the corresponding virtual value-added service for the user equipment to the merchant device.

After matching the merchant order number bound to the item ID, the processing server may transmit a service providing notification including the merchant order number to the merchant device, to instruct the merchant device to provide the user with the virtual value-added service indicated by the merchant order with the merchant order number. After receiving the service providing notification, the merchant device may determine the merchant order identified by using the merchant order number, and determine, according to the commodity identifier indicated in the merchant order, the virtual value-added service provided for the user equipment.

Further, the processing server may also notify, according to the merchant order number, the user equipment that the merchant order corresponding to the merchant order number has entered a status of service-to-be-provided.

Further, the processing server may obtain the merchant order transmitted by the merchant device (for example, in operation S33, the merchant device may transmit the merchant order along with the payment order generation request to the processing server; or the merchant device may upload the merchant order to the processing server separately), so that the processing server may determine the merchant order corresponding to the matched merchant order number, to support the user equipment in querying the merchant order in the status of service-to-be-provided.

Figure 6A:
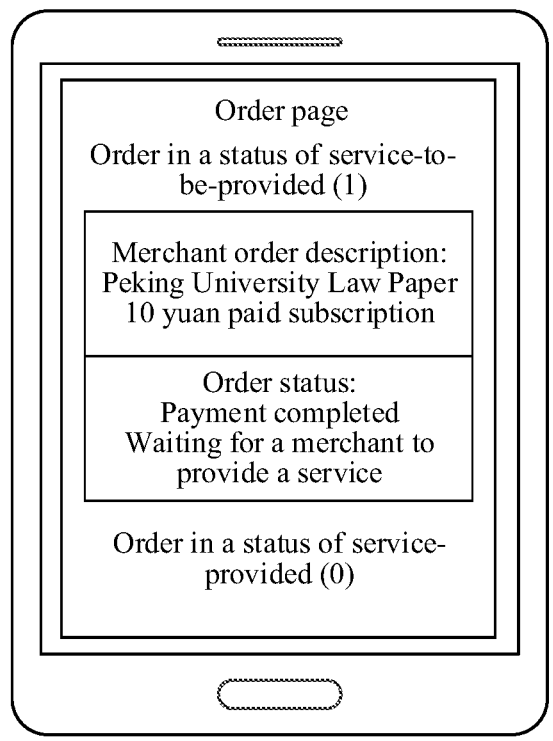
FIG. 6a is a first schematic diagram of an order status of a merchant order.

The user equipment may query the order status of the merchant order from the processing server, load an order status page, and show the merchant order that is in the status of service-to-be-provided and that is fed back by the processing server, as shown in FIG. 6*a*.

After receiving the notification transmitted by the processing server, the merchant device may determine the merchant order corresponding to the matched merchant order number, and determine, according to the commodity identifier of the merchant order, the corresponding virtual value-added service, to provide the corresponding virtual value-added service for the user equipment.

In an example, after determining the merchant order corresponding to the matched merchant order number and determining, based on the merchant order, the virtual value-added service to be provided, the merchant device may control the user equipment to refresh a service page, notify the user equipment that the virtual value-added service has been provided, and enable the user equipment to have the permission to use the virtual value-added service.

Figure 6B:
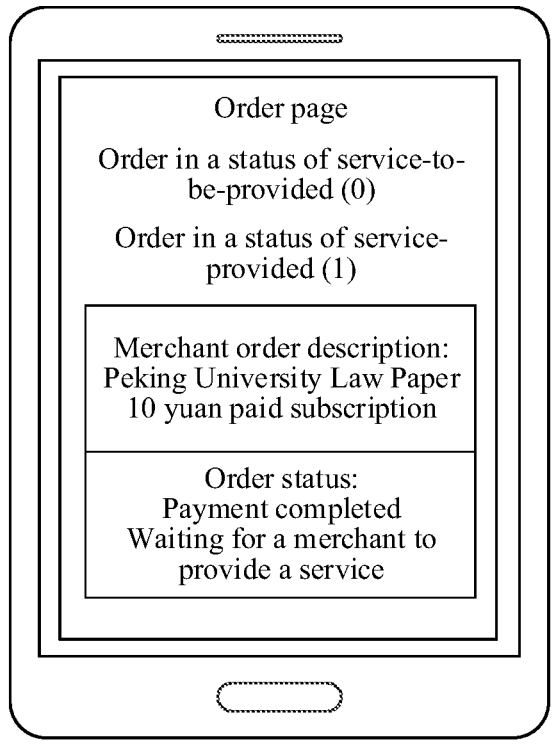
FIG. 6b is a second schematic diagram of an order status of a merchant order.

The processing server may update the order status of the merchant order as a status of service-provided, and show, on the order status page, that the status of the merchant order is the status of service-provided, as shown in FIG. 6*b*.

Based on the foregoing payment method, before the user equipment pays the item ID, the processing server may bind the item ID to the merchant order number, and the merchant order number identifies the merchant order, so that after completing the payment of the item ID, the user equipment may query, by using the merchant order number bound to the item ID, the merchant order of the virtual value-added service purchased by the user. A payment behavior of the user and the virtual value-added service actually purchased may be associated with each other through the binding between the item ID and the merchant order number. Therefore, when there are a plurality of merchants in an application, the user may query the bound merchant order number by using the item ID, to query the purchased virtual value-added service order (that is, the merchant order), and provide payment support for virtual value-added services provided by the plurality of merchants in one application.

Figure 7:
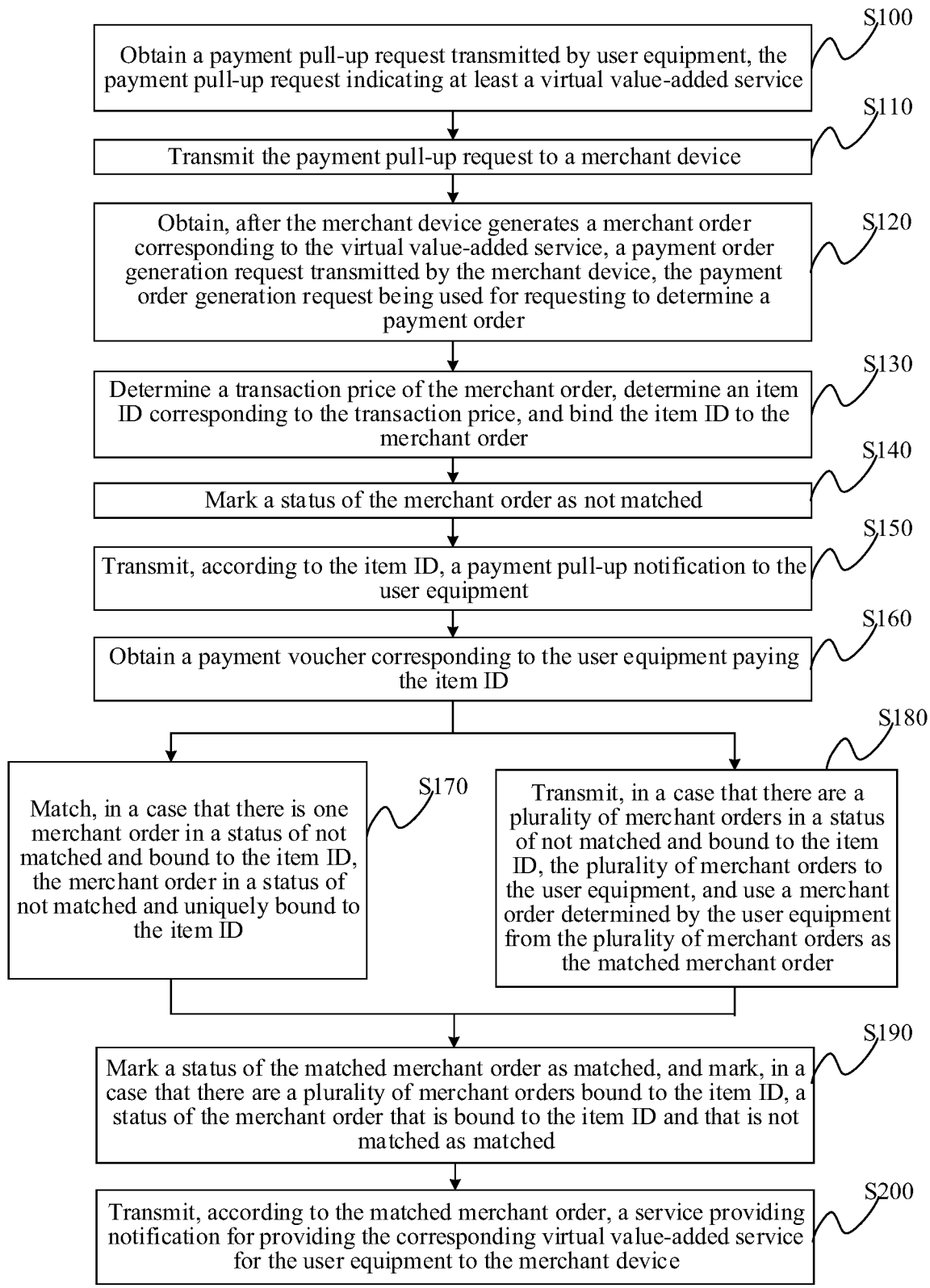
FIG. 7 is an optional flowchart of a payment method according to an embodiment of the disclosure.

Optionally, when the merchant order bound to the payment order is matched, in this embodiment of the disclosure, a status of the merchant order bound to the item ID may be set for accurate matching of the merchant order. From the perspective of a processing server, FIG. 7 shows an optional procedure of a payment method according to an embodiment of the disclosure. The procedure may be performed by the processing server. Referring to FIG. 7, the procedure may include the following operations S100-S200:

Operation S100. The processing server obtains a payment pull-up request transmitted by user equipment, the payment pull-up request indicating at least a virtual value-added service.

Operation S110. The processing server transmits the payment pull-up request to a merchant device.

It can be learned that the processing server may transmit the payment pull-up request transmitted by the user equipment to the merchant device.

Operation S120. The processing server obtains, after the merchant device generates a merchant order corresponding to the virtual value-added service, a payment order generation request transmitted by the merchant device, the payment order generation request being used for requesting to determine a payment order.

Operation S130. The processing server determines a transaction price of the merchant order, determines an item ID corresponding to the transaction price, and binds the item ID to the merchant order.

Optionally, the transaction price may be included in the payment order generation request.

Optionally, the payment order generation request may further include a merchant order number uniquely identifying the merchant order. The processing server may bind the item ID to the merchant order number by binding the item ID to the merchant order number.

Operation S140. The processing server marks a status of the merchant order as not being yet matched.

In this embodiment of the disclosure, after the item ID is bound to the merchant order, because the merchant order is in a status of not being yet matched, the status of the merchant order may be marked as not being yet matched.

It would be understood that, the merchant order bound to the payment order is matched after the payment voucher is obtained. Therefore, in a process in which the user equipment requests to pull up the payment for a plurality of consecutive times, but no payment voucher is obtained (for example, the user equipment requests to pull up the payment for a plurality of consecutive times, the merchant device generates a merchant order accordingly each time, and the processing server also determines an item ID accordingly each time, but the user equipment cancels the payment after pulling up the payment channel each time), there may be a plurality of merchant orders in a status of not being yet matched, where there may be a plurality of merchant orders in a status of not being yet matched that are bound to the same item ID (for example, one transaction price corresponds to a plurality of item IDs sequentially used in order, and in a case that a quantity of times for which the user equipment requests to pull up payment of virtual value-added services having the same transaction price reaches a quantity of polling times for the item ID corresponding to the transaction price, the processing server may repeatedly bind the item ID to the merchant orders of the virtual value-added services with the transaction price).

Operation S150. The processing server transmits, according to the item ID, a payment pull-up notification to the user equipment.

Operation S160. The processing server obtains a payment voucher corresponding to the user equipment paying the item ID.

Optionally, after receiving the payment pull-up notification, the user equipment may pull up a payment channel, perform a payment verification input operation, and transmit a payment request for the item ID to the payment channel server, so that after the payment verification succeeds, the payment channel server may generate a payment voucher corresponding to the item ID, and transmit the payment voucher to the user equipment, and the user equipment may then transmit the payment voucher to the processing server.

Optionally, after generating the payment voucher corresponding to the item ID, the payment channel server may also directly transmit the payment voucher to the user equipment.

Operation S170. The processing server matches, in a case that there is one merchant order in a status of not being yet matched and bound to the item ID, the one merchant order in a status of not being yet matched and uniquely bound to the item ID.

Operation S180. The processing server transmits, in a case that there are a plurality of merchant orders in a status of not being yet matched and bound to the item ID, the plurality of merchant orders to the user equipment, and uses a merchant order determined by the user equipment from the plurality of merchant orders as the matched merchant order.

Optionally, in operation S170 and operation S180, the merchant order may be represented by the merchant order number.

Operation S190. The processing server marks a status of the matched merchant order as matched, and marks, in a case that there are a plurality of merchant orders bound to the item ID, a status of the merchant order that is bound to the item ID and that is not being yet matched as matched.

Optionally, after the matched merchant order is determined from the merchant orders bound to the item ID, a status of the matched merchant order may be marked as matched, and the status of the merchant order that is bound to the item ID and that is not being yet matched also needs to be marked as matched, so that these merchant orders will no longer participate in the matching later.

Figure 8:
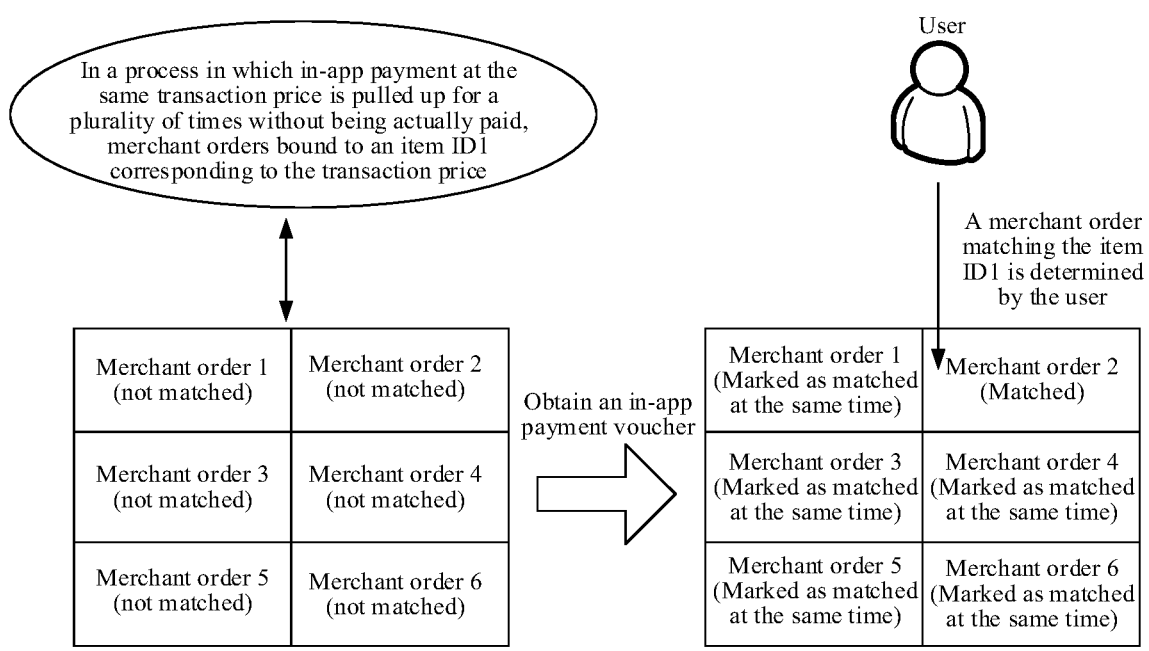
FIG. 8 is a schematic diagram of status marking of a merchant order.

In an example, in-app payment is used as an example. As shown in FIG. 8, in a process in which the user pulls up the in-app payment at the same transaction price for a plurality of times without actually paying, the processing server may bind the item ID to the merchant order, and mark the status of the bound merchant order at this time as not being yet matched, and there may be a plurality of merchant orders in a status of not being yet matched and bound to the same item ID.

After the user equipment completes the in-app payment for the item ID, the processing server may match, according to the item ID indicated by an in-app payment voucher, after the user participates in decision-making, the merchant order from the merchant orders in a status of not being yet matched and bound to the item ID. The status of the matched merchant order needs to be marked as matched, and at the same time, the statuses of other merchant orders that are bound to the item ID and that are not being yet matched are also marked as matched.

Operation S200. The processing server transmits, according to the matched merchant order, a service providing notification for providing the corresponding virtual value-added service for the user equipment to the merchant device.

Optionally, operation S190 and operation S200 may be in no particular order.

In this embodiment of the disclosure, when there are a plurality of merchant orders bound to the item ID, a mechanism that the user participates in decision-making may be added, and the status of the merchant order is set, to ensure that after the merchant order is matched for one time, both the merchant order that is not being yet matched and the matched merchant order at this time are marked as matched, so that these merchant orders will no longer participate in the matching later, thereby greatly ensuring the accuracy of matching the merchant order.

Optionally, the processing server may also determine settlement data of the payment channel server according to the payment voucher. The settlement data includes at least any one of the following: a commodity identifier corresponding to the virtual value-added service, a transaction price of the merchant order, a transaction currency, a settlement amount, merchant identity information corresponding to the merchant device, user identity information corresponding to the user equipment, and a merchant order number of the merchant order.

After determining the settlement amount, the processing server may share the settlement amount with a merchant corresponding to the merchant device according to a specified ratio.

In an application example, the following uses an in-app payment in a social application applet as a scenario for description. The user may perform in-app payments for different virtual value-added services in applets of different merchants, or may perform in-app payments for different virtual value-added services or the same virtual value-added service in an applet of the same merchant.

Figure 9:
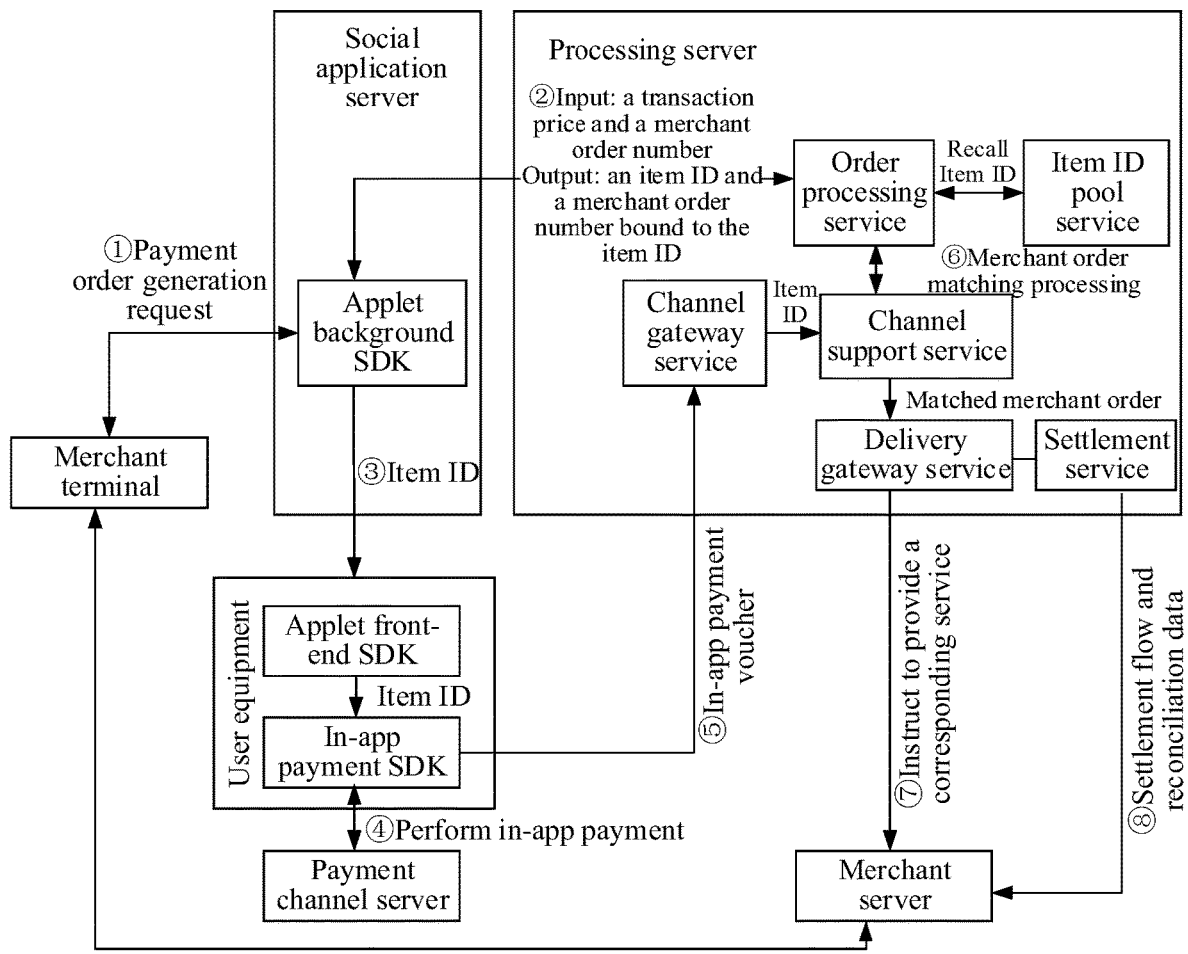
FIG. 9 is a schematic diagram of a payment method in an applet scenario.

As shown in FIG. 9, user equipment may interact with an applet background SDK of a social application server by using an applet front-end SDK; and the user equipment may interact with a payment channel server by using an in-app payment SDK. A merchant device includes a merchant terminal and a merchant server. The merchant terminal may interact with the applet background SDK of the social application server by using the applet front-end SDK.

The social application server includes the applet background SDK. A processing server is connected to the social application server and may communicate with the merchant device and the user equipment through the applet background SDK (in FIG. 9, for ease of illustration, some illustrations of interacting with, by the processing server, the merchant device and the user equipment through the applet background SDK are omitted). Further, the processing server includes an order processing service, a channel gateway service, a channel support service, an item ID pool service, a delivery gateway service, a settlement service, and other service functions. These service functions may be implemented through a program service, or through the server.

Returning to FIG. 9, for example, the user pays a paid subscription in an applet. When the user requests to pull up the payment of the paid subscription, the processing server may interact with the applet front-end SDK of the user equipment and the applet front-end SDK of the merchant terminal through the applet background SDK for an in-app payment pull-up request of the paid subscription. Thereafter, a process of the application example of the disclosure may include the following operations:

1. The merchant terminal generates a merchant order of the paid subscription, and transmits a payment order generation request to the applet background SDK through the applet front-end SDK of the merchant terminal, the payment order generation request including a transaction price and a merchant order number of the merchant order.

2. The applet background SDK forwards the payment order generation request to the order processing service of the processing server, and in this process, the transaction price and the merchant order number may be inputted to the order processing service, and the order processing service outputs an item ID corresponding to the transaction price according to item IDs corresponding to transaction prices recorded in an item ID pool, and binds the item ID to the merchant order number.

3. The applet background SDK transmits the item ID to the applet front-end SDK of the user equipment. Optionally, in the implementation of this process, the applet background SDK may first transmit the item ID to the merchant terminal, and the merchant terminal determines and records the item ID bound to the generated merchant order, then the merchant terminal transmits the item ID to the applet front-end SDK of the user equipment through the applet background SDK. Certainly, an implementation in which the applet background SDK directly transmits the item ID to the applet front-end SDK of the user equipment while notifying the merchant terminal of the item ID may also be supported.

4. The user equipment pulls up an in-app payment channel through the in-app payment SDK to perform in-app payment on the item ID.

5. The user equipment transmits, through the in-app payment SDK, an in-app payment voucher corresponding to the item ID and fed back by the payment channel server to the channel gateway service.

6. The channel support service performs the matching of the merchant order according to the in-app payment voucher corresponding to the item ID and fed back by the channel gateway service, so that a matched merchant order is obtained from the merchant orders bound to the item ID and outputted by the order processing service.

7. A delivery gateway instructs, based on the matched merchant order, the merchant server to provide a corresponding service for the user equipment, so that the merchant server determines, based on the matched merchant order, to provide a paid subscription service for the user equipment.

8. The settlement service transmits a settlement flow and reconciliation data of the merchant to the merchant server.

Although the foregoing description is made by using the virtual value-added service provided by the merchant of the social application applet as an example, during actual application, this embodiment of the disclosure may also be extended to a payment scenario of all virtual value-added services in an application, including a multi-merchant scenario and a single-merchant scenario in a single application. In addition, because channel support is dynamically pluggable and configurable, except for the two payment channels: IAP and GW, the payment method provided in this embodiment of the disclosure is also applicable to other payment channels, for example, a payment channel used in an e-commerce shopping scenario.

Similarly, the payment method provided in this embodiment of the disclosure is not only applicable to a mobile platform, but also supports all other current platforms, for example, PC and Web ends.

The payment method provided in this embodiment of the disclosure has at least the following advantages:

Related payment methods do not support virtual value-added services of a plurality of merchants. In the embodiments of the disclosure, when there are a plurality of merchants in an application, the bound merchant order may be queried by using the payment order, to query a purchased virtual value-added service order (that is, the merchant order), and provide payment support for virtual value-added services provided by the plurality of merchants in one application. The embodiments of the disclosure not only provide a multi-merchant payment solution for social application applets and public accounts, but are also applied to other similar multi-merchant scenarios in an application.

When the merchant order bound to the payment order is matched, if there are a plurality of merchant orders bound to the payment order, a mechanism that the user participates in decision-making may be used, thereby ensuring the matching of the merchant order actually paid by the payment order, and providing accurate payment method for multi-merchant scenarios such as social application applets and public accounts.

According to the payment method provided in the embodiments of the disclosure, when providing a virtual value-added service in an application, a merchant may implement the management of its own merchant orders, thereby providing great convenience for the merchant.

The settlement flow of the payment channel is provided for the merchant to check.

The following describes a payment apparatus provided in the embodiments of the disclosure from a perspective of a processing server. The payment apparatus described below may be regarded as a program module that needs to be set by the processing server to implement the payment method provided in the embodiments of the disclosure. Mutual reference may be made to the content of the payment apparatus described below and the content of the payment method described above.

Figure 10:
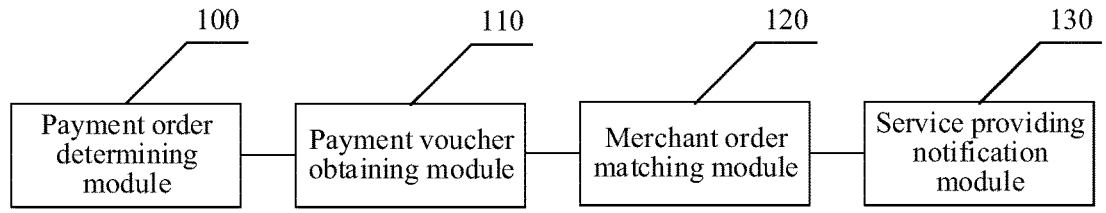
FIG. 10 is a structural block diagram of a payment apparatus according to an embodiment of the disclosure.

FIG. 10 is a structural block diagram of a payment apparatus according to an embodiment of the disclosure. The apparatus may be applied to a processing server. Referring to FIG. 10, the apparatus may include:

a payment order determining module 100, configured to determine a payment order bound to a merchant order generated by a merchant device, the merchant order corresponding to a virtual value-added service that user equipment requests to purchase;

a payment voucher obtaining module 110, configured to obtain a payment voucher of the payment order;

a merchant order matching module 120, configured to match, according to the payment voucher, the merchant order bound to the payment order; and a service providing notification module 130, configured to transmit, according to the matched merchant order, a service providing notification for providing the corresponding virtual value-added service for the user equipment to the merchant device.

Optionally, the payment order determining module 100 being configured to determine a payment order bound to a merchant order generated by a merchant device may include:

transmitting a payment pull-up request of the user equipment to the merchant device, the payment pull-up request indicating at least the virtual value-added service that the user equipment requests to purchase;

obtaining, after the merchant device generates the merchant order corresponding to the virtual value-added service, a payment order generation request indicating at least the merchant order and transmitted by the merchant device; and determining, according to the payment order generation request, the payment order bound to the merchant order.

Optionally, the payment voucher obtaining module 110 being configured to obtain a payment voucher of the payment order may include:

transmitting, according to the payment order, a payment pull-up notification to the user equipment; and obtaining the payment voucher corresponding to the user equipment paying the payment order.

Optionally, the payment order determining module 100 being configured to determine, according to the payment order generation request, the payment order bound to the merchant order may include:

determining, according to the payment order generation request, a transaction price of the merchant order; and determining an item ID corresponding to the transaction price, and binding the item ID to the merchant order, the item ID being registered to a payment channel server.

Optionally, the payment order generation request includes at least: a merchant order number uniquely identifying the merchant order, and the transaction price of the merchant order.

The payment order determining module 100 being configured to determine, according to the payment order generation request, a transaction price of the merchant order may include:

determining the transaction price of the merchant order included in the payment order generation request.

The payment order determining module 100 being configured to bind the item ID to the merchant order may include:

binding the item ID to the merchant order number.

Optionally, the merchant order matching module 120 being configured to match, according to the payment voucher, the merchant order bound to the payment order may include:

matching, in a case that there is one merchant order bound to the item ID, the merchant order uniquely bound to the item ID; and transmitting, in a case that there are a plurality of merchant orders bound to the item ID, the plurality of merchant orders to the user equipment, and using a merchant order determined by the user equipment from the plurality of merchant orders as the matched merchant order, where in a case that a quantity of times for which the user equipment requests to pull up payment of virtual value-added services having the same transaction price reaches a quantity of polling times for the item ID corresponding to the transaction price, the item ID is repeatedly bound to the merchant orders with the transaction price.

Optionally, the payment order determining module 100 being configured to determine a transaction price of the merchant order may include:

determining, according to an order in which the user equipment uses the transaction price this time, an item ID corresponding to the order from a plurality of item IDs corresponding to the transaction price, one transaction price corresponding to a plurality of item IDs sequentially used in order.

Figure 11:
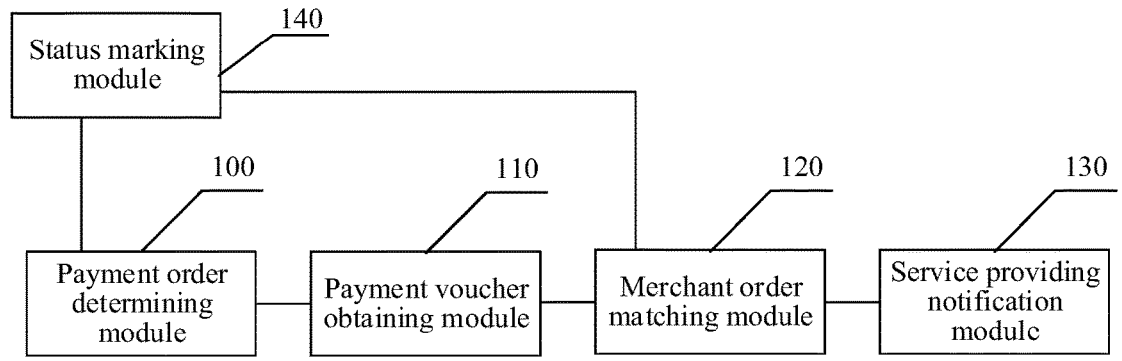
FIG. 11 is another structural block diagram of a payment apparatus according to an embodiment of the disclosure.

Optionally, FIG. 11 is another structural block diagram of a payment apparatus according to an embodiment of the disclosure. Referring to FIG. 10 and FIG. 11, the apparatus may further include:

a status marking module 140, configured to mark, after binding the item ID to the merchant order, a status of the merchant order as not being yet matched; and mark a status of the matched merchant order as matched.

Optionally, the status marking module 140 may further be configured to mark, after the merchant order bound to the payment order is matched, in a case that there are a plurality of merchant orders bound to the item ID, a status of the merchant order that is bound to the item ID and that is not being yet matched as matched.

Optionally, the matched merchant order is represented by the matched merchant order number, and the service providing notification module 130 being configured to transmit, according to the matched merchant order, a service providing notification for providing the corresponding virtual value-added service for the user equipment to the merchant device may include:

transmitting, according to the matched merchant order number, a service providing notification including the merchant order number to the merchant device, to instruct the merchant device to provide the user equipment with the virtual value-added service indicated by the merchant order with the merchant order number.

Optionally, the payment voucher obtaining module 110 being configured to transmit, according to the payment order, a payment pull-up notification to the user equipment may include:

generating a payment entry corresponding to the item ID; and transmitting the payment entry to the user equipment, to cause the user equipment to display a corresponding payment page according to the payment entry.

Figure 12:
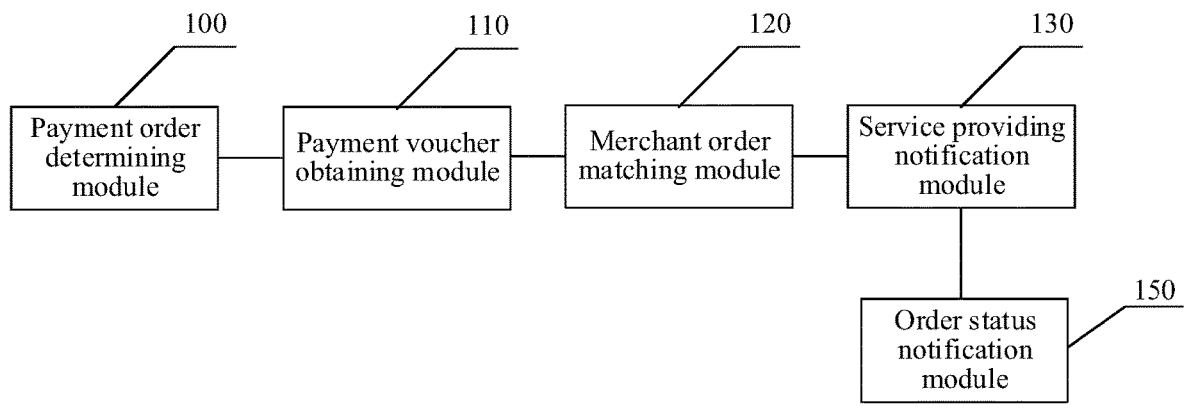
FIG. 12 is still another structural block diagram of a payment apparatus according to an embodiment of the disclosure.

Optionally, FIG. 12 is still another structural block diagram of a payment apparatus according to an embodiment of the disclosure. Referring to FIG. 10 and FIG. 12, the apparatus may further include:

an order status notification module 150, configured to: notify, after the service providing notification is transmitted to the merchant device, the user equipment that an order status of the matched merchant order is a status of service-to-be-provided; and notify, after the merchant device provides the virtual value-added service for the user equipment, the user equipment that the order status of the matched merchant order is a status of service-provided.

Optionally, the payment pull-up request includes at least: a commodity identifier corresponding to the virtual value-added service, one commodity identifier uniquely identifying one virtual value-added service; and the merchant order corresponding to the commodity identifier.

Figure 13:
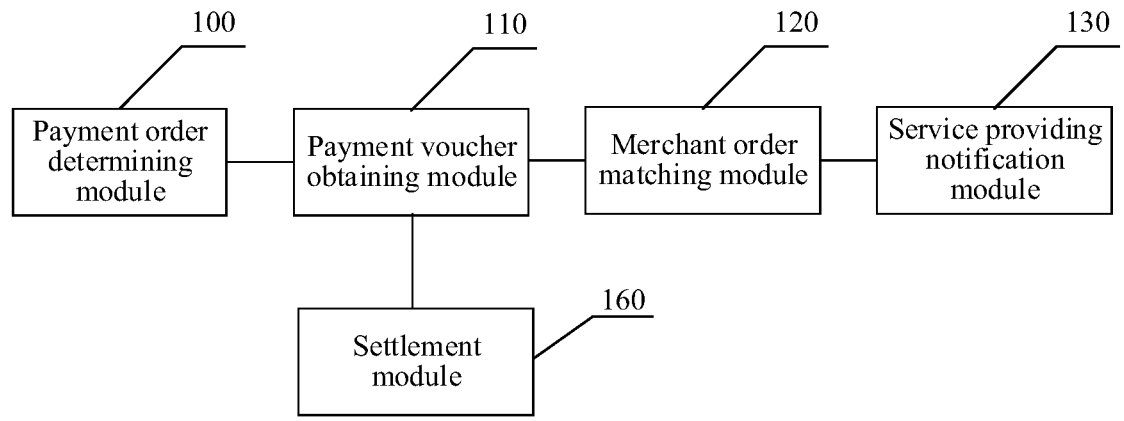
FIG. 13 is still yet another structural block diagram of a payment apparatus according to an embodiment of the disclosure.

Optionally, FIG. 13 is still yet another structural block diagram of a payment apparatus according to an embodiment of the disclosure. Referring to FIG. 10 and FIG. 13, the apparatus may further include:

a settlement module 160, configured to determine settlement data according to the payment voucher, the settlement data including at least any one of the following: a commodity identifier corresponding to the virtual value-added service, a transaction price of the merchant order, a transaction currency, a settlement amount, merchant identity information corresponding to the merchant device, user identity information corresponding to the user equipment, and a merchant order number of the merchant order; and share, based on the settlement amount, the settlement amount with a merchant corresponding to the merchant device according to a specified ratio.

An embodiment of the disclosure further provides a processing server. The processing server may load the foregoing program module applied to a processing server to implement the payment method provided in the embodiments of the disclosure. An optional hardware structure of the processing server may be shown in FIG. 14, and the processing server includes at least one processing chip 1, at least one communications interface 2, at least one memory 3, and at least one communications bus 4.

In this embodiment of the disclosure, there is at least one processing chip 1, at least one communications interface 2, at least one memory 3, and at least one communications bus 4, and communication among the processing chip 1, the communications interface 2, and the memory 3 is implemented by using the communications bus 4.

Optionally, the communications interface 2 may be an interface of a communications module (such as an interface of a GSM module). The processing chip 1 may be a central processing unit (CPU), an application-specific integrated circuit (ASIC), or one or more integrated circuits configured to implement the embodiments of the disclosure.

The memory 3 may include a high-speed RAM memory, or may also include a non-volatile memory, for example, at least one magnetic disk storage.

The memory 3 stores a program, and the processing chip 1 invokes the program stored in the memory 3 to implement the operations of the foregoing payment method performed by the processing server.

An embodiment of the disclosure further provides a storage medium, the storage medium may store a program suitable for being executed by a processing chip, to implement the operations of the foregoing payment method performed by the processing server.

Optionally, the foregoing program mainly implements the following functions:

determining a payment order bound to a merchant order generated by a merchant device, the merchant order corresponding to a virtual value-added service that user equipment requests to purchase;

obtaining a payment voucher of the payment order;

matching, according to the payment voucher, the merchant order bound to the payment order; and transmitting, according to the matched merchant order, a service providing notification for providing the corresponding virtual value-added service for the user equipment to the merchant device.

Optionally, for detailed functions and extended functions of the foregoing program, refer to the content of the payment method described above.

The following describes the payment apparatus provided in the embodiments of the disclosure from a perspective of a merchant device. The payment apparatus described below may be regarded as a program module that needs to be set by the merchant device to implement the payment method provided in the embodiments of the disclosure. Mutual reference may be made to the content of the payment apparatus described below and the content of the payment method described above.

Figure 15:
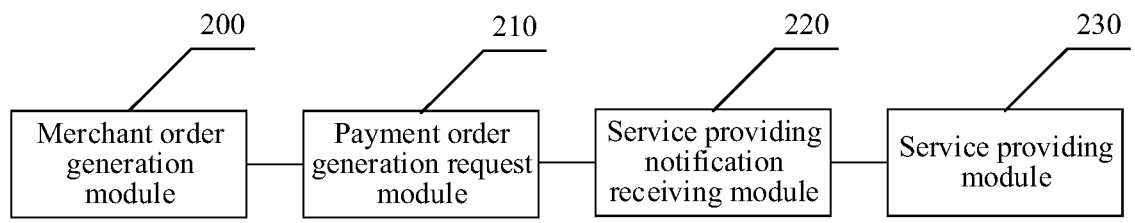
FIG. 15 is still yet another structural block diagram of a payment apparatus according to an embodiment of the disclosure.

FIG. 15 is still yet another structural block diagram of a payment apparatus according to an embodiment of the disclosure. The apparatus may be applied to a merchant device. Referring to FIG. 15, the apparatus may include:

a merchant order generation module 200, configured to generate a merchant order corresponding to a virtual value-added service that user equipment requests to purchase;

a payment order generation request module 210, configured to transmit a payment order generation request to a processing server, the payment order generation request being used for requesting to generate a payment order bound to the merchant order;

a service providing notification receiving module 220, configured to: receive, after the processing server obtains a payment voucher corresponding to the payment order and matches the merchant order bound to the payment order, a service providing notification transmitted by the processing server; and a service providing module 230, configured to provide, according to the service providing notification, the virtual value-added service corresponding to the matched merchant order for the user equipment.

Optionally, the merchant order generation module 200 being configured to generate a merchant order corresponding to a virtual value-added service that user equipment requests to purchase may include:

obtaining, a payment pull-up request of the user equipment, the payment pull-up request indicating at least the virtual value-added service that the user equipment requests to purchase; and generating the merchant order corresponding to the virtual value-added service.

Optionally, the merchant order includes at least: a merchant order number uniquely identifying the merchant order, and a transaction price of the merchant order.

The payment order generation request module 210 being configured to transmit a payment order generation request to a processing server may include:

transmitting the payment order generation request including at least the merchant order number and the transaction price to the processing server, the payment order being bound to the merchant order number.

Optionally, the payment order is represented by an item ID corresponding to the transaction price, one transaction price corresponding to a plurality of item IDs sequentially used in order.

Optionally, the service providing module 230 being configured to provide, according to the service providing notification, the virtual value-added service corresponding to the matched merchant order for the user equipment may include:

determining, according to the merchant order number included in the service providing notification, a merchant order corresponding to the merchant order number;

determining a virtual value-added service indicated by the merchant order; and providing the determined virtual value-added service for the user equipment.

Optionally, the payment pull-up request includes at least: a commodity identifier corresponding to the virtual value-added service, one commodity identifier uniquely identifying one virtual value-added service.

The merchant order generation module 200 being configured to generate a merchant order corresponding to a virtual value-added service that user equipment requests to purchase may include: generating a merchant order corresponding to the commodity identifier.

Figure 16:
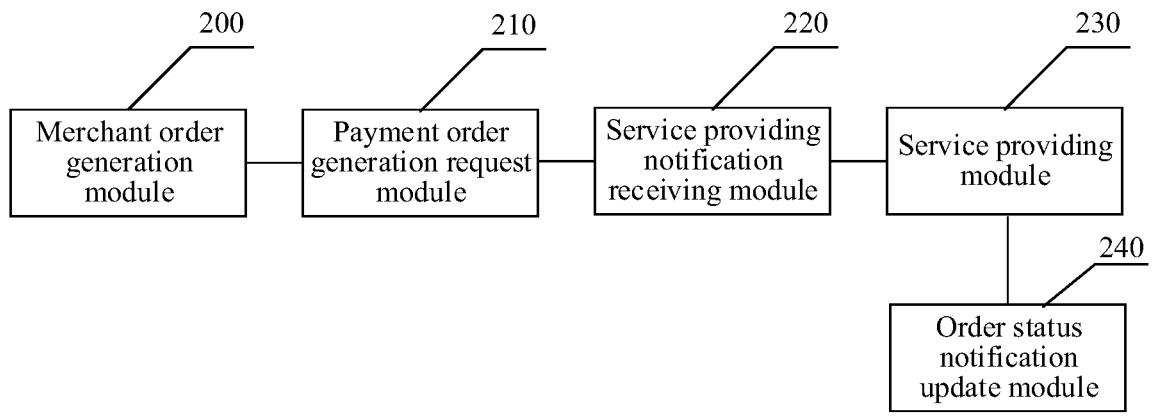
FIG. 16 is still yet another structural block diagram of a payment apparatus according to an embodiment of the disclosure.

Optionally, FIG. 16 is still yet another structural block diagram of a payment apparatus according to an embodiment of the disclosure. Referring to FIG. 15 and FIG. 16, the apparatus may include:

an order status notification update module 240, configured to instruct, after the virtual value-added service corresponding to the matched merchant order is provided for the user equipment, the processing server to update an order status of the matched merchant order to a status of service-provided.

An embodiment of the disclosure further provides a merchant device. The merchant device may load the foregoing program module applied to a merchant device to implement the payment method provided in the embodiments of the disclosure.

Figure 14:
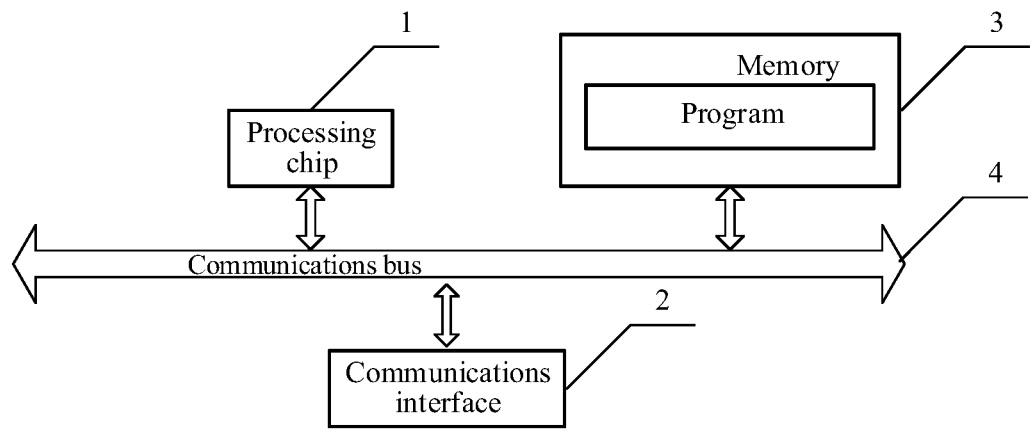
FIG. 14 is a block diagram of a hardware structure of a processing server according to an embodiment of the disclosure.

An optional hardware structure of the merchant device may be shown in FIG. 14. Optionally, the merchant device may include at least one memory and at least one processing chip, the memory storing a program, and the processing chip invoking the program to implement the operations of the foregoing payment method performed by the merchant device.

An embodiment of the disclosure further provides a storage medium, the storage medium may store a program suitable for being executed by a processing chip, to implement the operations of the foregoing payment method performed by the merchant device.

Optionally, the foregoing program mainly implements the following functions:

generating a merchant order corresponding to a virtual value-added service that user equipment requests to purchase;

transmitting a payment order generation request to a processing server, the payment order generation request being used for requesting the processing server to generate a payment order bound to the merchant order;

receiving, after the processing server obtains a payment voucher corresponding to the payment order and matches the merchant order bound to the payment order, a service providing notification transmitted by the processing server; and providing, according to the service providing notification, the virtual value-added service corresponding to the matched merchant order for the user equipment.

Optionally, for detailed functions and extended functions of the foregoing program, refer to the content of the payment method described above.

The following describes the payment apparatus provided in the embodiments of the disclosure from a perspective of user equipment. The payment apparatus described below may be regarded as a program module that needs to be set by the user equipment to implement the payment method provided in the embodiments of the disclosure. Mutual reference may be made to the content of the payment apparatus described below and the content of the payment method described above.

Figure 17:
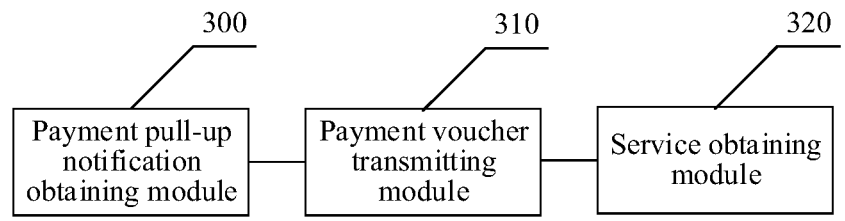
FIG. 17 is still yet another structural block diagram of a payment apparatus according to an embodiment of the disclosure.

FIG. 17 is another structural block diagram of a payment apparatus according to an embodiment of the disclosure. The apparatus may be applied to user equipment. Referring to FIG. 17, the apparatus may include:

a payment pull-up notification obtaining module 300, configured to obtain a payment pull-up notification indicating at least a payment order and transmitted by a processing server, the payment order being bound to a merchant order generated by a merchant device, the merchant order corresponding to a virtual value-added service that the user equipment requests to purchase;

a payment voucher transmitting module 310, configured to transmit a payment voucher corresponding to the payment order to the processing server; and a service obtaining module 320, configured to obtain, after the processing server matches the merchant order bound to the payment order according to the payment voucher and instructs the merchant device to provide the virtual value-added service corresponding to the matched merchant order, a virtual value-added service provided by the merchant device.

Optionally, before obtaining a payment pull-up notification indicating at least a payment order and transmitted by a processing server, the payment apparatus may be further configured to: transmit a payment pull-up request indicating at least the virtual value-added service to the processing server, to cause the processing server to transmit the payment pull-up request to the merchant device, so that the merchant device generates the merchant order corresponding to the virtual value-added service.

Optionally, the payment pull-up notification obtaining module 300 being configured to obtain a payment pull-up notification indicating at least a payment order and transmitted by a processing server may include:

obtaining, after the processing server determines the payment order bound to the merchant order generated by the merchant device, the payment pull-up notification transmitted by the processing server.

Optionally, the payment apparatus being configured to transmit a payment pull-up request indicating at least the virtual value-added service to the processing server may include:

accessing a service page of a merchant through an application; and clicking a payment pull-up entry of a virtual value-added service on the service page, and generating a payment pull-up request, the payment pull-up request indicating at least the virtual value-added service.

Optionally, the accessing a service page of a merchant through an application may include:

scanning a link QR code on a program page of the merchant through the application, or accessing a link address on a program page through the application to load the program page of the merchant; the program page having at least one payment pull-up entry of a virtual value-added service provided by the merchant.

Optionally, the generating a payment pull-up request may include:

determining a commodity identifier associated with the clicked payment pull-up entry, and generating a payment pull-up request including at least the commodity identifier.

Optionally, the payment pull-up notification obtaining module 300 being configured to obtain a payment pull-up notification indicating at least a payment order and transmitted by a processing server may include: obtaining a payment entry of the payment order.

Optionally, the payment voucher transmitting module 310 being configured to transmit a payment voucher corresponding to the payment order to the processing server may include:

paying the payment order according to the payment pull-up notification;

obtaining a payment voucher corresponding to the payment; and transmitting the payment voucher to the processing server.

Optionally, the payment voucher transmitting module 310 being configured to pay the payment order according to the payment pull-up notification may include:

displaying a corresponding payment page according to the payment entry; and transmitting, in response to a payment verification input operation performed by a user on the payment page, a payment request for the payment order to the payment channel server.

Optionally, the payment order is represented by an item ID corresponding to the transaction price of the merchant order, one transaction price corresponding to a plurality of item IDs sequentially used in order, and the merchant order being identified by a unique merchant order number.

Figure 18:
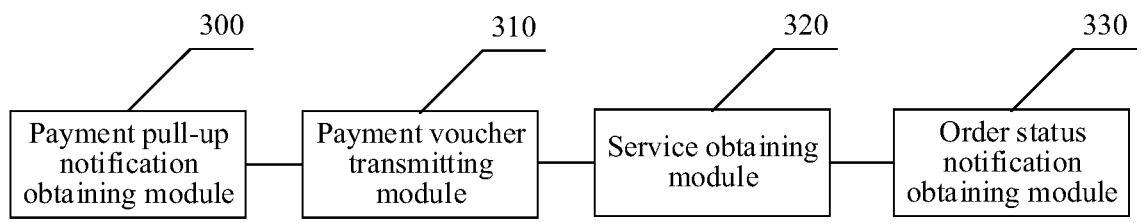
FIG. 18 is still yet another structural block diagram of a payment apparatus according to an embodiment of the disclosure.

FIG. 18 is another structural block diagram of a payment apparatus according to an embodiment of the disclosure. Referring to FIG. 17 and FIG. 18, the apparatus may further include:

an order status notification obtaining module 330, configured to obtain, after the processing server instructs the merchant device to provide the virtual value-added service corresponding to the matched merchant order, a notification that the order status of the matched merchant order transmitted by the processing server is a status of service-to-be-provided; and obtain, after obtaining the virtual value-added service provided by the merchant device, a notification that the order status of the matched merchant order transmitted by the processing server is a status of service-provided.

An embodiment of the disclosure further provides user equipment. The user equipment may load the foregoing program module applied to user equipment to implement the payment method provided in the embodiments of the disclosure.

An optional hardware structure of the user equipment may be shown in FIG. 14. Optionally, the user equipment may include at least one memory and at least one processing chip, the memory storing a program, and the processing chip invoking the program to implement the operations of the foregoing payment method performed by the user equipment.

An embodiment of the disclosure further provides a storage medium, and the storage medium may store a program suitable for being executed by a processing chip, to implement the operations of the foregoing payment method performed by the user equipment.

Optionally, the foregoing program mainly implements the following functions:

obtaining a payment pull-up notification indicating at least a payment order and transmitted by a processing server, the payment order being bound to a merchant order generated by a merchant device, the merchant order corresponding to a virtual value-added service that the user equipment requests to purchase;

transmitting a payment voucher corresponding to the payment order to the processing server; and obtaining, after the processing server matches the merchant order bound to the payment order according to the payment voucher and instructs the merchant device to provide the virtual value-added service corresponding to the matched merchant order, a virtual value-added service provided by the merchant device.

Optionally, for detailed functions and extended functions of the foregoing program, refer to the content of the payment method described above.

An embodiment of the disclosure further provides a payment system. A structure of the payment system may be shown in FIG. 1, and the payment system includes: user equipment, a merchant device, and a processing server. For functions implemented by the user equipment, the merchant device, and the processing server, refer to the foregoing descriptions, and details are not described herein again.

The embodiments in the specification are all described in a progressive manner. For same or similar parts in the embodiments, refer to these embodiments, and each embodiment focuses on a difference from other embodiments. The apparatus disclosed in the embodiments are corresponding to the method disclosed in the embodiments and therefore is only briefly described, and reference may be made to the descriptions of the method for the associated part.

A person skilled in the art may be further aware that, in combination with the examples described in the embodiments disclosed in this specification, units and algorithm operations may be implemented by electronic hardware, computer software, or a combination thereof. To clearly describe the interchangeability between the hardware and the software, the foregoing has described compositions and operations of each example in general according to functions. Whether these functions are executed in the manner of hardware or software depends on specific applications and design constraints of the technical solutions. A person skilled in the art may use different methods to implement the described functions for each particular application, but it is not to be considered that the implementation goes beyond the scope of the disclosure.

In combination with the embodiments herein, operations of the method or algorithm described may be directly implemented using hardware, a software module executed by a processing chip, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the art.

Based on the foregoing technical solutions, when user equipment purchases a virtual value-added service, a merchant device may generate a merchant order corresponding to the virtual value-added service, and a processing server determines a payment order that is applicable to a payment channel and is bound to the merchant order. Therefore, after the user equipment pays the payment order and purchases the virtual value-added service, the processing server may find the bound merchant order based on the payment order paid by the user equipment, so that the merchant device is accurately notified of the merchant order providing a service. Therefore, after the user equipment completes the payment, the virtual value-added service purchased by the user equipment is accurately provided.

In the embodiments of the disclosure, a payment behavior of a user and the virtual value-added service actually purchased may be associated with each other through the binding between the payment order and the merchant order. Therefore, when there are a plurality of merchants in an application, the user may query the bound merchant order by using the payment order, to query a purchased virtual value-added service order (that is, the merchant order), and provide payment support for virtual value-added services provided by the plurality of merchants in one application.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing description of the disclosed embodiments enables a person skilled in the art to implement or use the disclosure. It should be understood by a person of ordinary skill in the art that various modifications may be made to the embodiments, and general principles defined in this specification may be implemented in other embodiments without departing from the spirit or scope of the disclosure. Therefore, the disclosure will not be limited to the embodiments described in this specification but extends to the widest scope that complies with the principles and novelty disclosed in this specification.

What is claimed is:

1. A payment method by a processing server to process payment that is independently performed between a user equipment and a payment channel server, the method comprising:

generating, by the processing server, a payment order bound to a merchant order generated by a merchant device by determining a corresponding item ID, of a service and/or a product for purchase, that is registered with the payment channel server, the merchant order corresponding to the service and/or the product provided by the merchant device and indicating a transaction price of the service and/or the product, wherein a plurality of item IDs are registered to the payment channel server and are associated with the same transaction price, and the generating the payment order bound to the merchant order comprises:

determining one item ID as the corresponding item ID, among the plurality of item IDs, in a polling manner, by periodically and sequentially supplying the plurality of item IDs to be assigned to the transaction price each time a payment pull-up request of the user equipment is received for the same transaction price, and binding the determined one item ID to the merchant order, and with respect to a plurality of merchant orders that correspond to a plurality of payment pull-up requests of the user equipment for the same transaction price and are bound to the one item ID:

based on a payment via the payment channel server not having been made, statuses of the plurality of merchant orders are marked as not being yet matched, and based on the payment via the payment channel server being made for one of the plurality of merchant orders, the statuses of all the plurality of merchant orders are marked as being matched;

obtaining, from the user equipment by the processing server, a payment voucher, wherein the payment voucher is provided from the payment channel server to the user equipment based on payment of the payment order by the user equipment using the payment channel server, wherein the payment voucher indicates one item ID, among the plurality of item IDs, used by the user equipment to complete the payment of the payment order;

matching, by the processing server, based on the payment voucher, the merchant order bound to the payment order by using the one item ID; and transmitting, by the processing server to the merchant device, based on the matched merchant order, a service/product providing notification for providing the service and/or the product to the user equipment.

2. The payment method according to claim 1, wherein the generating comprises:

transmitting, by the processing server, the payment pull-up request of the user equipment to the merchant device, the payment pull-up request indicating the service and/or the product for purchase;

obtaining, by the processing server, a payment order generation request from the merchant device, the payment order generation request indicating at least the merchant order corresponding to the service and/or the product; and generating, by the processing server, based on the payment order generation request, the payment order bound to the merchant order.

3. The payment method according to claim 2, wherein the generating the payment order bound to the merchant order based on the payment order generation request comprises:

determining, by the processing server, based on the payment order generation request, a transaction price of the merchant order; and determining, by the processing server, an item identifier (ID) corresponding to the transaction price, and binding the item ID to the merchant order, the item ID being registered to the payment channel server.

4. The payment method according to claim 3, wherein the payment order generation request comprises a merchant order number for uniquely identifying the merchant order, and the transaction price of the merchant order, wherein the determining the transaction price comprises determining, by the processing server, the transaction price of the merchant order included in the payment order generation request, and wherein the binding comprises binding, by the processing server, the item ID to the merchant order number.

5. The payment method according to claim 3, wherein the determining the item ID comprises:

determining, by the processing server, based on a sequential order of using the transaction price, an item ID corresponding to the sequential order from the plurality of item IDs corresponding to the transaction price, the plurality of item IDs corresponding to one transaction price being sequentially used in order.

6. The payment method according to claim 1, wherein the obtaining comprises:

transmitting, by the processing server, based on the payment order, a payment pull-up notification to the user equipment; and obtaining, by the processing server, the payment voucher based on payment of the payment order.

7. The payment method according to claim 1, further comprising:

determining settlement data according to the payment voucher, the settlement data comprising at least one of a commodity identifier corresponding to the service and/or the product, a transaction price of the merchant order, a transaction currency, a settlement amount, merchant identity information corresponding to the merchant device, user identity information corresponding to the user equipment, or a merchant order number of the merchant order; and sharing, based on the settlement amount, the settlement amount with a merchant corresponding to the merchant device according to a specified ratio.

8. A processing server, comprising:

at least one memory configured to store program code; and at least one processor configured to read the program code and operate as instructed by the program code, the program code causing the at least one processor to perform operations of the method according to claim 1.

9. A non-transitory storage medium, storing a computer program, the computer program, when being executed by a processor, causing the processor to perform the payment method according to claim 1.

10. A payment apparatus, applied to a processing server to process payment that is independently performed between a user equipment and a payment channel server, the payment apparatus comprising:

at least one memory configured to store program code; and at least one processor configured to read the program code and operate as instructed by the program code, the program code comprising:

payment order generation code configured to cause at least one of the at least one processor to generate a payment order bound to a merchant order generated by a merchant device by determining a corresponding item ID, of a service and/or a product for purchase, that is registered with the payment channel server, the merchant order corresponding to the service and/or the product provided by the merchant device and indicating a transaction price of the service and/or the product, wherein a plurality of item IDs are registered to the payment channel server and are associated with the same transaction price, and the payment order generation code is configured to cause at least one of the at least one processor to generate the payment order bound to the merchant order by:

determining one item ID as the corresponding item ID, among the plurality of item IDs, in a polling manner, by periodically and sequentially supplying the plurality of item IDs to be assigned to the transaction price each time a payment pull-up request of the user equipment is received for the same transaction price, and binding the determined one item ID to the merchant order, and with respect to a plurality of merchant orders that correspond to a plurality of payment pull-up requests of the user equipment for the same transaction price and are bound to the one item ID:

based on a payment via the payment channel server not having been made, statuses of the plurality of merchant orders are marked as not being yet matched, and based on the payment via the payment channel server being made for one of the plurality of merchant orders, the statuses of all the plurality of merchant orders are marked as being matched;

payment voucher obtaining code configured to cause at least one of the at least one processor to obtain, from the user equipment, a payment voucher, wherein the payment voucher is provided from the payment channel server to the user equipment based on payment of the payment order by the user equipment using the payment channel server, wherein the payment voucher indicates one item ID, among the plurality of item IDs, used by the user equipment to complete the payment of the payment order;

merchant order matching code configured to cause at least one of the at least one processor to match, based on the payment voucher, the merchant order bound to the payment order by using the one item ID; and service providing notification code configured to cause at least one of the at least one processor to transmit, based on the matched merchant order, a service/product providing notification for providing the service to the user equipment.

11. The payment apparatus according to claim 10, wherein the payment order generation code comprises:

transmitting code configured to cause at least one of the at least one processor to transmit the payment pull-up request of the user equipment to the merchant device, the payment pull-up request indicating the service and/or the product for purchase;

obtaining code configured to cause at least one of the at least one processor to obtain a payment order generation request from the merchant device, the payment order generation request indicating at least the merchant order corresponding to the service and/or the product; and generation code configured to cause at least one of the at least one processor to generate, based on the payment order generation request, the payment order bound to the merchant order.

12. The payment apparatus according to claim 11, wherein the payment order generation code causes at least one of the at least one processor to generate, based on the payment order generation request, a transaction price of the merchant order; determine an item identifier (ID) corresponding to the transaction price; and bind the item ID to the merchant order, the item ID being registered to the payment channel server.

13. The payment apparatus according to claim 12, wherein the payment order generation request comprises a merchant order number for uniquely identifying the merchant order, and the transaction price of the merchant order, and wherein the payment order generation code causes at least one of the at least one processor to determine the transaction price of the merchant order included in the payment order generation request, and bind the item ID to the merchant order number.

14. The payment apparatus according to claim 12, wherein the payment order generation code causes at least one of the at least one processor to determine the item ID by determining, based on a sequential order of using the transaction price, an item ID corresponding to the sequential order from the plurality of item IDs corresponding to the transaction price, the plurality of item IDs corresponding to one transaction price being sequentially used in order.

15. The payment apparatus according to claim 10, wherein the payment voucher obtaining code causes at least one of the at least one processor to transmit based on the payment order, a payment pull-up notification to the user equipment, and obtain the payment voucher based on payment of the payment order.

16. A payment apparatus, applied to a merchant device, the payment apparatus comprising:

at least one memory configured to store program code; and at least one processor configured to read the program code and operate as instructed by the program code, the program code comprising:

merchant order generation code configured to cause at least one of the at least one processor to generate a merchant order corresponding to a service and/or a product provided by the merchant device and indicating a transaction price of the service and/or the product;

payment order generation request code configured to cause at least one of the at least one processor to transmit, to a processing server, a request for a payment order bound to the merchant order, the payment order being generated by the processing server based on determining a corresponding item ID, of the service and/or the product for purchase, that is registered with a payment channel server, wherein a plurality of item IDs are registered to the payment channel server and are associated with the same transaction price, and the merchant order generation code is configured to cause at least one of the at least one processor to generate the merchant order by:

determining one item ID as the corresponding item ID, among the plurality of item IDs, in a polling manner, by periodically and sequentially supplying the plurality of item IDs to be assigned to the transaction price each time a payment pull-up request of a user equipment is received for the same transaction price, and binding the determined one item ID to the merchant order, and wherein with respect to a plurality of merchant orders that correspond to a plurality of payment pull-up requests of the user equipment for the same transaction price and are bound to the one item ID:

based on a payment via the payment channel server not having been made, statuses of the plurality of merchant orders are marked as not being yet matched, and based on the payment via the payment channel server being made for one of the plurality of merchant orders, the statuses of all the plurality of merchant orders are marked as being matched;

service providing notification receiving code configured to cause at least one of the at least one processor to receive a service/product providing notification from the processing server, the service providing notification being based on a payment voucher that is obtained corresponding to the payment order bound to the merchant order, wherein the payment voucher is provided from the payment channel server to the user equipment based on payment of the payment order by the user equipment using the payment channel server, wherein the payment voucher indicates one item ID, among the plurality of item IDs, used by the user equipment to complete the payment of the payment order; and service providing code configured to cause at least one of the at least one processor to provide, based on the service/product providing notification, the service and/or the product corresponding to a matched merchant order to the user equipment, the matched merchant order being matched to the merchant order bound to the payment order by using the one item ID.

* * * * *